United States Patent

Oode et al.

[19]

[11] Patent Number: 6,124,989
[45] Date of Patent: Sep. 26, 2000

[54] IMAGE-FORMING OPTICAL SYSTEM

[75] Inventors: Hisashi Oode; Takayoshi Togino, both of Hachioji, Japan

[73] Assignee: Olympus Optical Co., Ltd., Tokyo, Japan

[21] Appl. No.: 09/330,990

[22] Filed: Jun. 14, 1999

[30] Foreign Application Priority Data

Aug. 21, 1998 [JP] Japan .................................. 10-235725

[51] Int. Cl.$^7$ ............................ G02B 17/00; G02B 3/02; G02B 9/00
[52] U.S. Cl. ........................... 359/729; 359/720; 359/738
[58] Field of Search ........................... 359/720, 726–731, 359/738, 630–640

[56] References Cited

U.S. PATENT DOCUMENTS

| | | | |
|---|---|---|---|
| 5,699,194 | 12/1997 | Takahashi | 359/633 |
| 5,701,202 | 12/1997 | Takahashi | 359/631 |
| 5,745,295 | 4/1998 | Takahashi | 359/631 |
| 5,936,773 | 8/1999 | Togino | 359/630 |
| 5,963,376 | 10/1999 | Togino | 359/676 |

OTHER PUBLICATIONS

European Abstract, Dialog(R)File 352: Derwent WPI, 1999, No. 010534976, Japanese Patent Pub. 7–333551 Jun. 1994, EPA 687932 Abst Dec. 1995.
European Abstract, Dialog(R)File 352: Derwent WPI, 1999, No. 011965452, Japanese Patent Pub. 10–153748 Jun. 1998.
European Abstract, Dialog(R)File 352: Derwent WPI, 1999, No. 010585485, Japanese Patent Pub. 07–333505 Dec. 1995.
Patent Abstracts of Japan, Pub. No. 08–292,368 Nov. 1996.
Patent Abstracts of Japan, Pub. No. 08–292,371 Nov. 1996.
Patent Abstracts of Japan, Pub. No. 08–292,372 Nov. 1996.
European Abstract, Dialog(R)File 352: Derwent WPI, 1999, No. 011144717, Japanese Patent Pub. 09–005650 Jan. 1997.
European Abstract, Dialog(R)File 352: Derwent WPI, 1999, No. 011662889, Japanese Patent Pub. 09–090229 Apr. 1997.
European Abstract, Dialog(R)File 352: Derwent WPI, 1999, No. 011459296, Japanese Patent Pub. 09–211331 Jan. 1996.
European Abstract, Dialog(R)File 352: Derwent WPI, 1999, No. 011426976, Japanese Patent pub. 09–222561 Feb. 1996.
European Abstract, Dialog(R)File 352: Derwent WPI, 1999, No. 011498469, Japanese Patent Pub. 09–222563 Aug. 1997, EP 790513 Abst Aug. 1997.
European Abstract Dialog(R)File 352: Derwent WPI, 1999, No. 011529109, Japanese Patent Pub. 09–258105 Mar. 1996.
European Abstract, Dialog(R)File 352: Derwent WPI, 1999, No. 011529109, Japanese Patent Pub. 09–258106 Mar. 1993, EP 802436 A2 Oct. 1997.
European Abstract, Dialog(R)File 352: Derwent WPI, 1999, No. 011426976, Japanese Patent Pub. 10–020196 Jul. 1996, EP 790513 A2 Aug. 1997.

*Primary Examiner*—Scott J. Sugarman
*Assistant Examiner*—David N. Spector
*Attorney, Agent, or Firm*—Pillsbury Madison & Sutro LLP

[57] ABSTRACT

A high-performance image-forming optical system made compact and thin by folding an optical path using reflecting surfaces arranged to minimize the number of reflections. The image-forming optical system has only one prism member. The prism member has a first surface through which a light beam enters the prism member, a second surface reflecting the incident light beam in the prism member, a third surface reflecting the reflected light beam in the prism member, and a fourth surface through which the light beam exits from the prism member. At least one of the second and third surfaces has a curved surface configuration that gives a power to a light beam. The curved surface configuration has a rotationally asymmetric surface configuration that corrects aberrations due to decentration. A pupil is provided between the first and fourth surfaces, for example, on the second surface.

28 Claims, 12 Drawing Sheets

IMAGE-FORMING OPTICAL SYSTEM

BACKGROUND OF THE INVENTION

The present invention relates to image-forming optical systems. More particularly, the present invention relates to a decentered optical system with a reflecting surface having a power for use in optical apparatus using a small-sized image pickup device, e.g. video cameras, digital still cameras, film scanners, and endoscopes.

Recently, with the achievement of small-sized image pickup devices, image-forming optical systems for use in video cameras, digital still cameras, film scanners, endoscopes, etc. have also been demanded to reduce in size and weight and also in cost.

In the general rotationally symmetric coaxial optical systems, however, optical elements are arranged in the direction of the optical axis. Therefore, there is a limit to the reduction in thickness of the optical systems. At the same time, the number of lens elements unavoidably increases because it is necessary to correct chromatic aberration produced by a rotationally symmetric refracting lens used in the optical systems. Therefore, it is difficult to reduce the cost in the present state of the art. Under these circumstances, there have recently been proposed optical systems designed to be compact in size by giving a power to a reflecting surface, which produces no chromatic aberration, and folding an optical path in the optical axis direction.

Japanese Patent Application Unexamined Publication Number [hereinafter referred to as "JP(A)"] 7-333505 proposes to reduce the thickness of an optical system by giving a power to a decentered reflecting surface and folding an optical path. In an example thereof, however, the number of constituent optical members is as large as five, and actual optical performance is unclear. No mention is made of the configuration of the reflecting surface.

JP(A) 8-292371, 9-5650 and 9-90229 each disclose an optical system in which an optical path is folded by a single prism or a plurality of mirrors integrated into a single block, and an image is relayed in the optical system to form a final image. In these conventional examples, however, the number of reflections increases because the image is relayed. Accordingly, surface accuracy errors and decentration accuracy errors are transferred while being added up. Consequently, the accuracy required for each surface becomes tight, causing the cost to increase unfavorably. The relay of the image also causes the overall volumetric capacity of the optical system to increase unfavorably.

JP(A) 9-222563 discloses an example of an optical system that uses a plurality of prisms. However, because the optical system is arranged to relay an image, the cost increases and the optical system becomes large in size unfavorably for the same reasons as stated above.

JP(A) 9-211331 discloses an example of an optical system in which an optical path is folded by using a single prism to achieve a reduction in size of the optical system. However, the optical system is not satisfactorily corrected for aberrations.

JP(A) 8-292368, 8-292372, 9-222561, 9-258105 and 9-258106 all disclose examples of zoom lens systems. In these examples, however, the number of reflections is undesirably large because an image is relayed in a prism. Therefore, surface accuracy errors and decentration accuracy errors of reflecting surfaces are transferred while being added up, unfavorably. At the same time, the overall size of the optical system unavoidably increases, unfavorably.

JP(A) 10-20196 discloses an example of a two-unit zoom lens system having a positive front unit and a negative rear unit, in which the positive front unit comprises a prism of negative power placed on the object side of a stop and a prism of positive power placed on the image side of the stop. JP(A) 10-20196 also discloses an example in which the positive front unit, which comprises a prism of negative power and a prism of positive power, is divided into two to form a three-unit zoom lens system having a negative unit, a positive unit and a negative unit. However, the prisms used in these examples each have two transmitting surfaces and two reflecting surfaces, which are all independent surfaces. Therefore, a relatively wide space must be ensured for the prisms. In addition, the image plane is large in size in conformity to the Leica size film format. Accordingly, the prisms themselves become unavoidably large in size. Furthermore, because the disclosed zoom lens systems are not telecentric on the image side, it is difficult to apply them to image pickup devices such as CCDs. In either of the examples of zoom lens systems, zooming is performed by moving the prisms. Accordingly, the decentration accuracy required for the reflecting surfaces becomes tight in order to maintain the required performance over the entire zooming range, resulting in an increase in the cost.

When a general refracting optical system is used to obtain a desired refracting power, chromatic aberration occurs at an interface surface thereof according to chromatic dispersion characteristics of an optical element. To correct the chromatic aberration and also correct other ray aberrations, the refracting optical system needs a large number of constituent elements, causing the cost to increase. In addition, because the optical path extends straight along the optical axis, the entire optical system undesirably lengthens in the direction of the optical axis, resulting in an unfavorably large-sized image pickup apparatus.

In decentered optical systems such as those described above in regard to the prior art, an imaged figure or the like is undesirably distorted and the correct shape cannot be reproduced unless the formed image is favorably corrected for aberrations, particularly rotationally asymmetric distortion.

Furthermore, in a case where a reflecting surface is used in a decentered optical system, the sensitivity to decentration errors of the reflecting surface is twice as high as that in the case of a refracting surface, and as the number of reflections increases, decentration errors that are transferred while being added up increase correspondingly. Consequently, manufacturing accuracy and assembly accuracy, e.g. surface accuracy and decentration accuracy, required for reflecting surfaces become even more strict.

SUMMARY OF THE INVENTION

In view of the above-described problems of the prior art, an object of the present invention is to provide a high-performance and low-cost image-forming optical system having a minimal number of constituent optical elements.

Another object of the present invention is to provide a high-performance image-forming optical system that is made compact and thin by folding an optical path using reflecting surfaces arranged to minimize the number of reflections.

To attain the above-described objects, the present invention provides an image-forming optical system having a positive refracting power as a whole for forming an object image. The image-forming optical system has only one prism member that is formed from a medium having a refractive index (n) larger than 1 (n>1). The prism member has a first surface through which a light beam enters the prism member, and a second surface that reflects the light beam in the prism member. The prism member further has a third surface that reflects the reflected light beam in the prism member, and a fourth surface through which the light beam exits from the prism member. At least one of the second and third surfaces of the prism member has a curved surface configuration that gives a power to a light beam. The curved surface configuration has a rotationally asymmetric surface configuration that corrects aberrations due to decentration. A pupil is provided between the first and fourth surfaces of the prism member.

The reasons for adopting the above-described arrangement in the present invention, together with the function thereof, will be described below in order.

The image-forming optical system according to the present invention, which is provided to attain the above-described objects, has only one prism member that is formed from a medium having a refractive index (n) larger than 1 (n>1).

A refracting optical element such as a lens is provided with a power by giving a curvature to an interface surface thereof. Accordingly, when rays are refracted at the interface surface of the lens, chromatic aberration unavoidably occurs according to chromatic dispersion characteristics of the refracting optical element. Consequently, the common practice is to add another refracting optical element for the purpose of correcting the chromatic aberration.

Meanwhile, a reflecting optical element such as a mirror or a prism produces no chromatic aberration in theory even when a reflecting surface thereof is provided with a power, and need not add another optical element only for the purpose of correcting chromatic aberration. Accordingly, an optical system using a reflecting optical element allows the number of constituent optical elements to be reduced from the viewpoint of chromatic aberration correction in comparison to an optical system using a refracting optical element.

At the same time, a reflecting optical system using a reflecting optical element allows the optical system itself to be compact in size in comparison to a refracting optical system because the optical path is folded in the reflecting optical system.

Reflecting surfaces require a high degree of accuracy for assembly and adjustment because they have high sensitivity to decentration errors in comparison to refracting surfaces. However, among reflecting optical elements, prisms, in which the positional relationship between surfaces is fixed, only need to control decentration as a single unit of prism and do not need high assembly accuracy and a large number of man-hours for adjustment as are needed for other reflecting optical elements.

Furthermore, a prism has an entrance surface and an exit surface, which are refracting surfaces, and a reflecting surface. Therefore, the degree of freedom for aberration correction is high in comparison to a mirror, which has only a reflecting surface. In particular, if the prism reflecting surface is assigned the greater part of the desired power to thereby reduce the powers of the entrance and exit surfaces, which are refracting surfaces, it is possible to reduce chromatic aberration to a very small quantity in comparison to refracting optical elements such as lenses while maintaining the degree of freedom for aberration correction at a high level in comparison to mirrors. Furthermore, the inside of a prism is filled with a transparent medium having a refractive index higher than that of air. Therefore, it is possible to obtain a longer optical path length than in the case of air. Accordingly, the use of a prism makes it possible to obtain an optical system that is thinner and more compact than those formed from lenses, mirrors and so forth, which are placed in the air.

In addition, an image-forming optical system is required to exhibit favorable image-forming performance as far as the peripheral portions of the image field, not to mention the performance required for the center of the image field. In the case of a general coaxial optical system, the sign of the ray height of extra-axial rays is inverted at a stop. Accordingly, if optical elements are not in symmetry with respect to the stop, off-axis aberrations are aggravated. For this reason, the common practice is to place refracting surfaces at respective positions facing each other across the stop, thereby obtaining a satisfactory symmetry with respect to the stop, and thus correcting off-axis aberrations.

Accordingly, the present invention adopts an arrangement in which a pupil is provided between the first and fourth surfaces of the prism member, which has four surfaces, to obtain a satisfactory symmetry with respect to the pupil, thereby enabling not only axial aberrations but also off-axis aberrations to be favorably corrected.

In order to obtain a beautiful image by an image-forming optical system, it is necessary that an image formed by the image-forming optical system should have a certain amount of light (brightness). To obtain a bright image, it is necessary to enlarge the pupil to a certain extent. However, an increase in size of the prism must be avoided as much as possible in a decentered prism optical system such as that in the present invention, in which the optical path is folded and a power is given to a reflecting surface to achieve a compact optical system in comparison to a centered optical system. When the pupil is placed outside the prism optical system (i.e. on the object or image side thereof), the prism size increases unavoidably to prevent vignetting of the marginal rays in order to maintain a predetermined field angle. Accordingly, it is desirable from the viewpoint of overall performance improvement to arrange the decentered prism optical system such that the pupil is placed inside the prism as stated above.

In addition, it is desirable that the image-forming optical system according to the present invention should be approximately telecentric on the image side. The arrangement of an image-forming optical system that is approximately telecentric on the image side will be described below in detail. As has been stated above, reflecting surfaces have a high decentration error sensitivity in comparison to refracting surfaces. Therefore, it is desirable to provide an arrangement of an optical system that is as independent of the high decentration error sensitivity as possible. In the case of a general coaxial optical system arranged to be approximately telecentric on the image side, because extra-axial principal rays are approximately parallel to the optical axis, the positional accuracy of the extra-axial rays is satisfactorily maintained on the image plane even if defocusing is effected. Therefore, the image-forming optical system according to the present invention is arranged to reflect the property of the above-described arrangement. In particular, to prevent the performance of an optical system using a reflecting surface, which has a relatively high decentration error sensitivity, from being deteriorated by focusing, it is desirable to adopt an arrangement in which the optical system is approximately telecentric on the image side, whereby the positional accuracy of extra-axial rays is maintained favorably.

Such an arrangement enables the present invention to be suitably applied to an image pickup optical system using an image pickup device, e.g. a CCD, in particular. Adopting the above-described arrangement minimizes the influence of the cosine fourth law. Accordingly, it is also possible to reduce shading.

As has been stated above, adopting the basic arrangement of the present invention makes it possible to obtain a compact image-forming optical system that has a smaller number of constituent optical elements than in the case of a refracting optical system and exhibits favorable performance throughout the image field, from the center to the periphery thereof.

In the image-forming optical system according to the present invention, the only one prism member has a first surface through which a light beam enters the prism member, and a second surface that reflects the light beam in the prism member. The prism member further has a third surface that reflects the reflected light beam in the prism member, and a fourth surface through which the light beam exits from the prism member. At least one of the second and third surfaces of the prism member has a curved surface configuration that gives a power to a light beam. The curved surface configuration has a rotationally asymmetric surface configuration that corrects aberrations due to decentration.

When a ray that is emitted from the object center and passes through the center of the stop to reach the center of the image plane is defined as an axial principal ray, it is desirable that at least one reflecting surface of the prism member should be decentered with respect to the axial principal ray. If at least one reflecting surface is not decentered with respect to the axial principal ray, the axial principal ray travels along the same optical path when incident on and reflected from the reflecting surface, and thus the axial principal ray is intercepted in the optical system undesirably. As a result, an image is formed from only a light beam whose central portion is shaded. Consequently, the center of the image is unfavorably dark, or no image is formed in the center of the image field.

It is also possible to decenter a reflecting surface with a power with respect to the axial principal ray.

When a reflecting surface with a power is decentered with respect to the axial principal ray, it is desirable that at least one of surfaces constituting the prism member used in the present invention should be a rotationally asymmetric surface. It is particularly preferable from the viewpoint of aberration correction that at least one reflecting surface should be a rotationally asymmetric surface.

The reasons for adopting the above-described arrangements in the present invention will be described below in detail.

First, a coordinate system used in the following description and rotationally asymmetric surfaces will be described.

An optical axis defined by a straight line along which the axial principal ray travels until it intersects the first surface of the optical system is defined as a Z-axis. An axis perpendicularly intersecting the Z-axis in the decentration plane of each surface constituting the image-forming optical system is defined as a Y-axis. An axis perpendicularly intersecting the optical axis and also perpendicularly intersecting the Y-axis is defined as an X-axis. Ray tracing is forward ray tracing in which rays are traced from the object toward the image plane.

In general, a spherical lens system comprising only a spherical lens is arranged such that aberrations produced by spherical surfaces, such as spherical aberration, coma and curvature of field, are corrected with some surfaces by canceling the aberrations with each other, thereby reducing aberrations as a whole.

On the other hand, rotationally symmetric aspherical surfaces and the like are used to correct aberrations favorably with a minimal number of surfaces. The reason for this is to reduce various aberrations that would be produced by spherical surfaces.

However, in a decentered optical system, rotationally asymmetric aberrations due to decentration cannot be corrected by a rotationally symmetric optical system. Rotationally asymmetric aberrations due to decentration include distortion, curvature of field, and astigmatic and comatic aberrations, which occur even on the axis.

First, rotationally asymmetric curvature of field will be described. For example, when rays from an infinitely distant object point are incident on a decentered concave mirror, the rays are reflected by the concave mirror to form an image. In this case, the back focal length from that portion of the concave mirror on which the rays strike to the image surface is a half the radius of curvature of the portion on which the rays strike in a case where the medium on the image side is air. Consequently, as shown in FIG. 11, an image surface tilted with respect to the axial principal ray is formed. It is impossible to correct such rotationally asymmetric curvature of field by a rotationally symmetric optical system.

To correct the tilted curvature of field by the concave mirror M itself, which is the source of the curvature of field, the concave mirror M is formed from a rotationally asymmetric surface, and, in this example, the concave mirror M is arranged such that the curvature is made strong (refracting power is increased) in the positive direction of the Y-axis, whereas the curvature is made weak (refracting power is reduced) in the negative direction of the Y-axis. By doing so, the tilted curvature of field can be corrected. It is also possible to obtain a flat image surface with a minimal number of constituent surfaces by placing a rotationally asymmetric surface having the same effect as that of the above-described arrangement in the optical system separately from the concave mirror M.

It is preferable that the rotationally asymmetric surface should be a rotationally asymmetric surface having no axis of rotational symmetry in the surface nor out of the surface. If the rotationally asymmetric surface has no axis of rotational symmetry in the surface nor out of the surface, the degree of freedom increases, and this is favorable for aberration correction.

Next, rotationally asymmetric astigmatism will be described.

A decentered concave mirror M produces astigmatism even for axial rays, as shown in FIG. 12, as in the case of the above. The astigmatism can be corrected by appropriately changing the curvatures in the X- and Y-axis directions of the rotationally asymmetric surface as in the case of the above.

Rotationally asymmetric coma will be described below.

A decentered concave mirror M produces coma even for axial rays, as shown in FIG. 13, as in the case of the above. The coma can be corrected by changing the tilt of the rotationally asymmetric surface according as the distance from the origin of the X-axis increases, and further appropriately changing the tilt of the surface according to the sign (positive or negative) of the Y-axis.

The image-forming optical system according to the present invention may also be arranged such that the above-described at least one surface having a reflecting action is decentered with respect to the axial principal ray and has a rotationally asymmetric surface configuration and further has a power. By adopting such an arrangement, decentration aberrations produced as the result of giving a power to the reflecting surface can be corrected by the surface itself. In addition, the power of the refracting surfaces of the prism is reduced, and thus chromatic aberration produced in the prism can be minimized.

The rotationally asymmetric surface used in the present invention should preferably be a plane-symmetry free-form surface having only one plane of symmetry. Free-form surfaces used in the present invention are defined by the following equation (a). It should be noted that the Z-axis of the defining equation is the axis of a free-form surface.

$$Z = (r^2/R)\Big/\left[1 + \sqrt{\{1-(1+k)(r/R)^2\}}\right] + \sum_{j=1}^{66} C_j X^m Y^n \quad (a)$$

In Eq. (a), the first term is a spherical surface term, and the second term is a free-form surface term.

In the spherical surface term:
R: the radius of curvature at the vertex
k: a conic constant
r=√(X²+Y²)

The free-form surface term is given by $$\sum_{j=1}^{66} C_j X^m Y^n = C_1 + C_2 X + C_3 Y + C_4 X^2 + C_5 XY + C_6 Y^2 + C_7 X^3 +$$
$$C_8 X^2 Y + C_9 XY^2 + C_{10} Y^3 + C_{11} X^4 + C_{12} X^3 Y + C_{13} X^2 Y^2 +$$
$$C_{14} XY^3 + C_{15} Y^4 + C_{16} X^5 + C_{17} X^4 Y + C_{18} X^3 Y^2 + C_{19} X^2 Y^3 +$$
$$C_{20} XY^4 + C_{21} Y^5 + C_{22} X^6 + C_{23} X^5 Y + C_{24} X^4 Y^2 + C_{25} X^3 Y^3 +$$
$$C_{26} X^2 Y^4 + C_{27} XY^5 + C_{28} Y^6 + C_{29} X^7 + C_{30} X^6 Y + C_{31} X^5 Y^2 +$$
$$C_{32} X^4 Y^3 + C_{33} X^3 Y^4 + C_{34} X^2 Y^5 + C_{35} XY^6 + C_{36} Y^7 \ldots$$

where $C_j$ (j is an integer of 1 or higher) are coefficients.

In general, the above-described free-form surface does not have planes of symmetry in both the XZ- and YZ-planes. In the present invention, however, a free-form surface having only one plane of symmetry parallel to the YZ-plane is obtained by making all terms with odd-numbered powers of X zero. For example, in the above defining equation (a), the coefficients of the terms $C_2$, $C_5$, $C_7$, $C_9$, $C_{12}$, $C_{14}$, $C_{16}$, $C_{18}$, $C_{20}$, $C_{23}$, $C_{25}$, $C_{27}$, $C_{29}$, $C_{31}$, $C_{33}$, $C_{35}$, . . . are set equal to zero. By doing so, it is possible to obtain a free-form surface having only one plane of symmetry parallel to the YZ-plane.

A free-form surface having only one plane of symmetry parallel to the XZ-plane is obtained by making all terms with odd-numbered powers of Y zero. For example, in the above defining equation (a), the coefficients of the terms $C_3$, $C_5$, $C_8$, $C_{10}$, $C_{12}$, $C_{14}$, $C_{17}$, $C_{19}$, $C_{21}$, $C_{23}$, $C_{25}$, $C_{27}$, $C_{30}$, $C_{32}$, $C_{34}$, $C_{36}$, . . . are set equal to zero. By doing so, it is possible to obtain a free-form surface having only one plane of symmetry parallel to the XZ-plane.

Furthermore, the direction of decentration is determined in correspondence to either of the directions of the above-described planes of symmetry. For example, with respect to the plane of symmetry parallel to the YZ-plane, the direction of decentration of the optical system is determined to be the Y-axis direction. With respect to the plane of symmetry parallel to the XZ-plane, the direction of decentration of the optical system is determined to be the X-axis direction. By doing so, rotationally asymmetric aberrations due to decentration can be corrected effectively, and at the same time, the productivity can be improved.

It should be noted that the above defining equation (a) is shown as merely an example, and that the feature of the present invention resides in that rotationally asymmetric aberrations due to decentration are corrected and, at the same time, the productivity is improved by using a rotationally asymmetric surface having only one plane of symmetry. Therefore, the same advantageous effect can be obtained for any other defining equation that expresses a rotationally asymmetric surface.

Incidentally, when the prism member is formed from two reflecting surfaces and two transmitting surfaces as stated above, the degree of freedom for aberration correction increases, and thus the amount of aberration produced in the prism member is minimized. In addition, because the relative decentration between the two reflecting surfaces is small, aberrations produced by the two reflecting surfaces are corrected with these reflecting surfaces by canceling the aberrations each other. Therefore, the amount of aberration produced in the prism member is favorably small. It is more desirable that the two reflecting surfaces should have powers of different signs. By doing so, it is possible to enhance the effect of correcting each other's aberrations by the two reflecting surfaces and hence possible to obtain high resolution.

When a light ray passing through the center of an image plane, which is determined by the image-forming optical system, and also passing through the center of the pupil is defined as an axial principal ray, it is desirable for the second surface to have a configuration that reflects rays entering the prism member through the first surface while giving a negative power to the rays in a plane containing the axial principal ray traveling from the first surface to the fourth surface.

It is desirable for the third surface to have a configuration that reflects the rays reflected in the prism member by the second surface while giving a positive power to the rays.

By giving a relatively strong negative power to the second surface of the prism member, it is possible to converge rays of wide field angle in the optical system and hence possible to reduce the size of the prism member. Of the reflecting surfaces in the prism member, the second surface is closest to the object side. In a case where a retrofocus type optical system is formed by using negative and positive optical surfaces, aberrations produced in each unit of the optical system are reduced and aberrations produced in the entire optical system are also reduced by increasing the spacing between the front unit, which has a negative power, and the rear unit, which has a positive power. Non-decentered optical systems suffer from the problem that the overall length becomes unavoidably long. In an optical system that is decentered and has a folded optical path as in the present invention, the overall size of the optical system can be reduced even when the overall length along the optical axis increases.

In the present invention, it is desirable for the prism member to be arranged such that the first and fourth surfaces substantially face each other across the medium, and the second and third surfaces substantially face each other across the medium, whereby rays entering the prism member through the first surface form a folded optical path toward the third surface through the reflection at the second surface, and the rays reflected by the second surface form a folded optical path toward the fourth surface through the reflection at the third surface.

When a light ray passing through the center of an image plane, which is determined by the image-forming optical system, and also passing through the center of the pupil is defined as an axial principal ray, it is desirable for the prism member to be arranged such that the axial principal ray traveling through the medium from the first surface to the fourth surface forms a Z-shaped optical path.

It is desirable from the viewpoint of design and aberration correcting performance to arrange the prism member so that the optical path in the prism member is formed in a Z-shape (including an optical path in the form of a mirror image of a Z-shape, a zigzag optical path bent at acute angles, and a zigzag optical path bent at obtuse angles), thereby preventing any portions of the axial principal ray from intersecting each other in the prism member. With this arrangement, the incidence and exit directions of the axial principal ray as reflected at the second surface are opposite to those of the axial principal ray as reflected at the third surface. Therefore, it is easy to make aberration correction.

It is desirable to place the pupil in the optical path between the first and third surfaces. It is particularly desirable to place the pupil on the second surface.

It is desirable for the second surface to be smaller than any of the first, third and fourth surfaces in terms of the size of the effective surface area that contributes to the transmission or reflection of a light beam.

As has been stated above, it is desirable to arrange the image-forming optical system of the present invention such that the pupil lies inside the prism member. In addition, it is desirable to widen the field angle in order to further improve the performance of the image-forming optical system. In realization of a wide field angle, however, the effective diameter of the light beam enlarges as the distance from the pupil position increases toward the object side, resulting in an increase in the size of the prism member.

Therefore, it is desirable to place the pupil at such a position in the prism member that the distance of the optical path from the pupil to the first surface is favorably short. It is more desirable to make the pupil coincident with a reflecting surface from the viewpoint of manufacture of the decentered prism, for example, the disposition of the stop. It is most desirable to place the pupil on the second surface.

Regarding the configuration of each surface of the prism member, it is desirable that both the second and third surfaces of the prism member should have a rotationally asymmetric surface configuration that gives a power to a light beam and corrects aberrations due to decentration.

In this case, it is desirable that the rotationally asymmetric surface configuration of at least one of the second and third surfaces of the prism member should be a plane-symmetry free-form surface having only one plane of symmetry.

It is desirable that the rotationally asymmetric surface configurations of both the second and third surfaces of the prism member should be plane-symmetry free-form surfaces each having only one plane of symmetry.

In the latter case, it is desirable for the prism member to be arranged such that the only one plane of symmetry of the plane-symmetry free-form surface that forms the second surface and the only one plane of symmetry of the plane-symmetry free-form surface that forms the third surface are formed in the same plane. In addition, it is desirable for the prism member to be arranged such that the only one plane of symmetry of each of the plane-symmetry free-form surfaces that form the second and third surfaces is approximately coincident with the center of the pupil.

In these cases, it is desirable to arrange the prism member such that at least one of the first and fourth surfaces thereof has a rotationally asymmetric surface configuration that gives a power to a light beam and corrects aberrations due to decentration. A refracting surface having such a surface configuration is effective in correcting aberrations due to decentration.

In this case, it is desirable that the rotationally asymmetric surface configuration of at least one of the first and fourth surfaces of the prism member should be a plane-symmetry free-form surface having only one plane of symmetry.

It is desirable that both the first and fourth surfaces of the prism member should have a rotationally asymmetric surface configuration that gives a power to a light beam and corrects aberrations due to decentration.

In this case, it is desirable that the rotationally asymmetric surface configurations of the first and fourth surfaces of the prism member should be plane-symmetry free-form surfaces each having only one plane of symmetry.

In the present invention, a stop should preferably be placed on the pupil.

Let us define the power of a decentered optical system and that of an optical surface. As shown in FIG. 15, when the direction of decentration of a decentered optical system S is taken in the Y-axis direction, a light ray which is parallel to the axial principal ray of the decentered optical system S and which has a small height d in the YZ-plane is made to enter the decentered optical system S from the object side thereof. The angle that is formed between that ray and the axial principal ray exiting from the decentered optical system S when the two rays are projected onto the YZ-plane is denoted by $\delta y$, and $\delta y/d$ is defined as the power Py in the Y-axis direction of the decentered optical system S. Similarly, a light ray which is parallel to the axial principal ray of the decentered optical system S and which has a small height d in the X-axis direction, which is perpendicular to the YZ-plane, is made to enter the decentered optical system S from the object side thereof. The angle that is formed between that ray and the axial principal ray exiting from the decentered optical system S when the two rays are projected onto a plane perpendicularly intersecting the YZ-plane and containing the axial principal ray is denoted by $\delta x$, and $\delta x/d$ is defined as the power Px in the X-axis direction of the decentered optical system S. The power Pyn in the Y-axis direction and power Pxn in the X-axis direction of a decentered optical surface n constituting the decentered optical system S are defined in the same way as the above.

Furthermore, the reciprocals of the above-described powers are defined as the focal length Fy in the Y-axis direction of the decentered optical system S, the focal length Fx in the X-axis direction of the decentered optical system S, the focal length Fyn in the Y-axis direction of the decentered optical surface n, and the focal length Fxn in the X-axis direction of the decentered optical surface n, respectively.

The relationship between the power of each surface and the power of the entire optical system will be described below. The value obtained by dividing the power of the second surface of the prism member by the power of the entire optical system is denoted by Pxs2/Px for the X-axis direction and Pys2/Py for the Y-axis direction. The value obtained by dividing the power of the third surface of the prism member by the power of the entire optical system is denoted by Pxs3/Px for the X-axis direction and Pys3/Py for the Y-axis direction. It is desirable that both Pxs2/Px and Pys2/Py should be negative. By giving a relatively strong negative power to the second surface of the prism member, it is possible to converge rays of wide field angle in the optical system and hence possible to reduce the size of the prism member. Of the reflecting surfaces in the prism member, the second surface is closest to the object side. In a case where a retrofocus type optical system is formed by using negative and positive optical surfaces, aberrations produced in each unit of the optical system are reduced and aberrations produced in the entire optical system are also reduced by increasing the spacing between the front unit, which is a negative unit, and the rear unit, which is a positive unit. Non-decentered optical systems suffer from the problem that the overall length becomes unavoidably long. In an optical system that is decentered and has a folded optical path as in the present invention, the overall size of the optical system can be reduced even when the overall length along the optical axis increases.

It is more desirable to satisfy at least one of the following conditions:

$$-2.0 < Pxs2/Px < 0.0 \tag{1}$$

$$-3.0 < Pys2/Py < -0.2 \tag{2}$$

If Pxs2/Px or Pys2/Py is not larger than the lower limit, i.e. −2.0 or −3.0, the negative power of the second surface becomes excessively strong. Accordingly, to obtain a predetermined power with the entire optical system, the load imposed on another surface having a positive power must be increased. Consequently, it becomes impossible for the optical system to maintain a favorable aberration correction condition as a whole. If Pxs2/Px or Pys2/Py is not smaller than the upper limit, i.e. 0.0 or −0.2, the negative power of the second surface becomes excessively weak. Consequently, the light beam-converging action weakens, and the overall size of the optical system becomes unfavorably large.

It is even more desirable to satisfy at least one of the following conditions:

$$-1.5 < Pxs2/Px < 0.0 \tag{1-1}$$

$$-2.5 < Pys2/Py < -0.5 \tag{2-1}$$

The meaning of the upper and lower limits of each of the conditions (1-1) and (2-1) is the same as the above.

It is still more desirable to satisfy at least one of the following conditions:

$$-1.0 < Pxs2/Px < -0.3 \tag{1-2}$$

$$-2.0 < Pys2/Py < -1.0 \tag{2-2}$$

The meaning of the upper and lower limits of each of the conditions (1-2) and (2-2) is the same as the above.

The following is a description of the power of the third surface. This surface is placed relatively close to the stop and therefore aggravates relatively little aberrations in the peripheral image. Accordingly, it is possible to give a relatively strong positive power to the third surface. In addition, because this surface has a small amount of displacement, even when a relatively strong positive power is given to the third surface, decentration aberrations will not occur to a considerable extent. Accordingly, it is possible to obtain favorable image-formation performance.

It is desirable to satisfy at least one of the following conditions:

$$0 < Pxs3/Px < 3.0 \tag{3}$$

$$0 < Pys3/Py < 3.0 \tag{4}$$

If Pxs3/Px or Pys3/Py is not larger than the lower limit, i.e. 0, the positive power becomes excessively weak. Accordingly, a positive power must be assigned to another surface having a large amount of displacement. Consequently, decentration aberrations become large and impossible to correct favorably. If Pxs3/Px or Pys3/Py is not smaller than the upper limit, i.e. 3.0, the positive power of the third surface becomes excessively strong. Consequently, aberrations produced by the third surface become excessively large and hence difficult to correct by another surface.

It is even more desirable to satisfy at least one of the following conditions:

$$0 < Pxs3/Px < 2.0 \tag{3-1}$$

$$0 < Pys3/Py < 2.0 \tag{4-1}$$

The meaning of the upper and lower limits of each of the conditions (3-1) and (4-1) is the same as the above.

It is still more desirable to satisfy at least one of the following conditions:

$$0.2 < Pxs3/Px < 1.5 \tag{3-2}$$

$$0.2 < Pys3/Py < 1.5 \tag{4-2}$$

The meaning of the upper and lower limits of each of the conditions (3-2) and (4-2) is the same as the above.

When a ray that is emitted from the object center and passes through the center of the stop to reach the center of the image is defined as an axial principal ray, it is necessary that the incident angle of the axial principal ray as reflected by the second surface should satisfy the following condition in order to form the prism member such that the first surface, which is an entrance surface of the prism member, and the third surface, which is a second reflecting surface, have different surface configurations. By forming the first and third surfaces of the prism member from different surfaces, it is possible to reduce decentration aberrations produced by the third surface, which is decentered.

It is important to satisfy the following condition:

$$10° < S2\theta < 80° \tag{5}$$

where S2θ is the angle of incidence of the axial principal ray on the second surface.

If S2θ is not larger than the lower limit of the condition (5), i.e. 10°, the incident angle becomes small, so that the first surface and the third surface undesirably overlap each other. Consequently, it becomes impossible to form these surfaces from different surfaces. If S2θ is not smaller than the upper limit, i.e. 80°, the amount of displacement becomes excessively large, and decentration aberrations produced by this surface become large and impossible to correct by another surface.

It is more desirable to satisfy the following condition:

$$10° < S2\theta < 60° \tag{5-1}$$

The meaning of the upper and lower limits of the condition (5-1) is the same as the above.

It is still more desirable to satisfy the following condition:

$$25° < S2\theta < 40° \tag{5-2}$$

The meaning of the upper and lower limits of the condition (5-2) is the same as the above.

It is desirable to minimize the incident angle of the axial principal ray as reflected by the third surface. In the optical system according to the present invention, aberration correction can be favorably effected throughout the optical system by giving the principal power of the optical system to the third surface. The reason for this is as follows. The optical system according to the present invention is arranged such that even if the amount of displacement of the third surface is small, the optical path can be taken out of the prism member by the fourth surface, which is subsequent to the third surface. Therefore, the desired optical path can be formed even when the incident angle at the third surface is relatively small.

It is desirable from the viewpoint of aberration correction of the optical system to satisfy the following condition:

$$0° < S3\theta < 40° \tag{6}$$

where $S3\theta$ is the angle of incidence of the axial principal ray on the third surface.

If $S3\theta$ is not larger than the lower limit of the condition (6), i.e. 0°, the incident angle becomes excessively small, and it becomes impossible to form the prism optical system itself. If $S3\theta$ is not smaller than the upper limit, i.e. 40°, the amount of displacement becomes excessively large, and decentration aberrations produced by this surface become large and impossible to correct by another surface.

It is even more desirable to satisfy the following condition:

$$5° < S3\theta < 30° \tag{6-1}$$

The meaning of the upper and lower limits of the condition (6-1) is the same as the above.

It is still more desirable to satisfy the following condition:

$$5° < S3\theta < 20° \tag{6-2}$$

The meaning of the upper and lower limits of the condition (6-2) is the same as the above.

In the image-forming optical system according to the present invention, focusing of the image-forming optical system can be effected by moving the entire optical system. However, it is also possible to effect focusing by moving the image-formation plane in the direction of the axial principal ray exiting from the surface closest to the image side. By doing so, it is possible to prevent displacement of the axial principal ray on the entrance side due to focusing even if the direction in which the axial principal ray from the object enters the optical system is not coincident with the direction of the axial principal ray exiting from the surface closest to the image side owing to the decentration of the image-forming optical system. It is also possible to effect focusing by moving a plurality of wedge-shaped prisms, which are formed by dividing a plane-parallel plate, in a direction perpendicular to the Z-axis. In this case also, focusing can be performed independently of the decentration of the image-forming optical system.

In the image-forming optical system according to the present invention, if at least the prism member is formed by using an organic material such as a plastic material, the cost can be reduced. It is desirable to use a material of low moisture absorption, such as amorphous polyolefin, because such a material has a minimum change in image-forming performance with changes in moisture.

Furthermore, the optical path can be folded in a direction different from the decentration direction of the image-forming optical system according to the present invention by placing a reflecting optical member, e.g. a mirror, on the object side of the entrance surface of the image-forming optical system. By doing so, the degree of freedom for layout of the image-forming optical system further increases, and the overall size of the image-forming optical apparatus can be further reduced.

In the present invention, the image-forming optical system can be formed from the prism member alone. By doing so, the number of components is reduced, and the cost is lowered.

In the present invention, the image-forming optical system may include another lens (positive or negative lens) as a constituent element in addition to the prism member at one or each of a plurality of positions selected from a position on the object side of the prism member and a position on the image side of the prism member.

The image-forming optical system according to the present invention may be a fast, single focal length lens system. Alternatively, the image-forming optical system may be arranged in the form of a zoom lens system (variable-magnification image-forming optical system) by combining it with a single or plurality of refracting optical systems that may be provided on the object or image side of the prism member.

In the present invention, the refracting and reflecting surfaces of the image-forming optical system may be formed from spherical surfaces or rotationally symmetric aspherical surfaces.

In a case where the above-described image-forming optical system according to the present invention is placed in an image pickup part of an image pickup apparatus, or in a case where the image pickup apparatus is a photographic apparatus having a camera mechanism, it is possible to adopt an arrangement in which the prism member is placed closest to the object side among optical elements having an optical action, and the entrance surface of the prism member is decentered with respect to the optical axis, and further a cover member is placed on the object side of the prism member at right angles to the optical axis. The arrangement may also be such that the prism member has on the object side thereof an entrance surface decentered with respect to the optical axis, and a cover lens having a power is placed on the object side of the entrance surface of the prism member in coaxial relation to the optical axis so as to face the entrance surface across an air spacing.

If a prism member is placed closest to the object side and a decentered entrance surface is provided on the front side of a photographic apparatus as stated above, the obliquely tilted entrance surface is seen from the subject, and it gives the illusion that the photographic center of the apparatus is deviated from the subject when the entrance surface is seen from the subject side. Therefore, a cover member or a cover lens is placed at right angles to the optical axis, thereby preventing the subject from feeling incongruous when seeing the entrance surface, and allowing the subject to be photographed with the same feeling as in the case of general photographic apparatus.

A finder optical system can be formed by using any of the above-described image-forming optical systems according to the present invention as a finder objective optical system and adding an image-inverting optical system for erecting an object image formed by the finder objective optical system and an ocular optical system.

In addition, it is possible to construct a camera apparatus by using the finder optical system and an objective optical system for photography provided in parallel to the finder optical system.

In addition, an image pickup optical system can be constructed by using any of the foregoing image-forming optical systems according to the present invention and an image pickup device placed in an image plane formed by the image-forming optical system.

In addition, a camera apparatus can be constructed by using any of the foregoing image-forming optical systems according to the present invention as an objective optical system for photography, and a finder optical system placed in an optical path separate from an optical path of the objective optical system for photography or in an optical path branched from the optical path of the objective optical system for photography.

In addition, an electronic camera apparatus can be constructed by using any of the foregoing image-forming optical systems according to the present invention, an image pickup device placed in an image plane formed by the image-forming optical system, a recording medium for recording image information received by the image pickup device, and an image display device that receives image information from the recording medium or the image pickup device to form an image for observation.

In addition, an endoscope system can be constructed by using an observation system having any of the foregoing image-forming optical systems according to the present invention and an image transmitting member for transmitting an image formed by the image-forming optical system along a longitudinal axis, and an illumination system having an illuminating light source and an illuminating light transmitting member for transmitting illuminating light from the illuminating light source along the longitudinal axis.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

DESCRIPTION OF THE PREFERRED EMBODIMENTS

Examples 1 to 3 of the image-forming optical system according to the present invention will be described below. It should be noted that constituent parameters of each example will be shown later.

Figure 1:
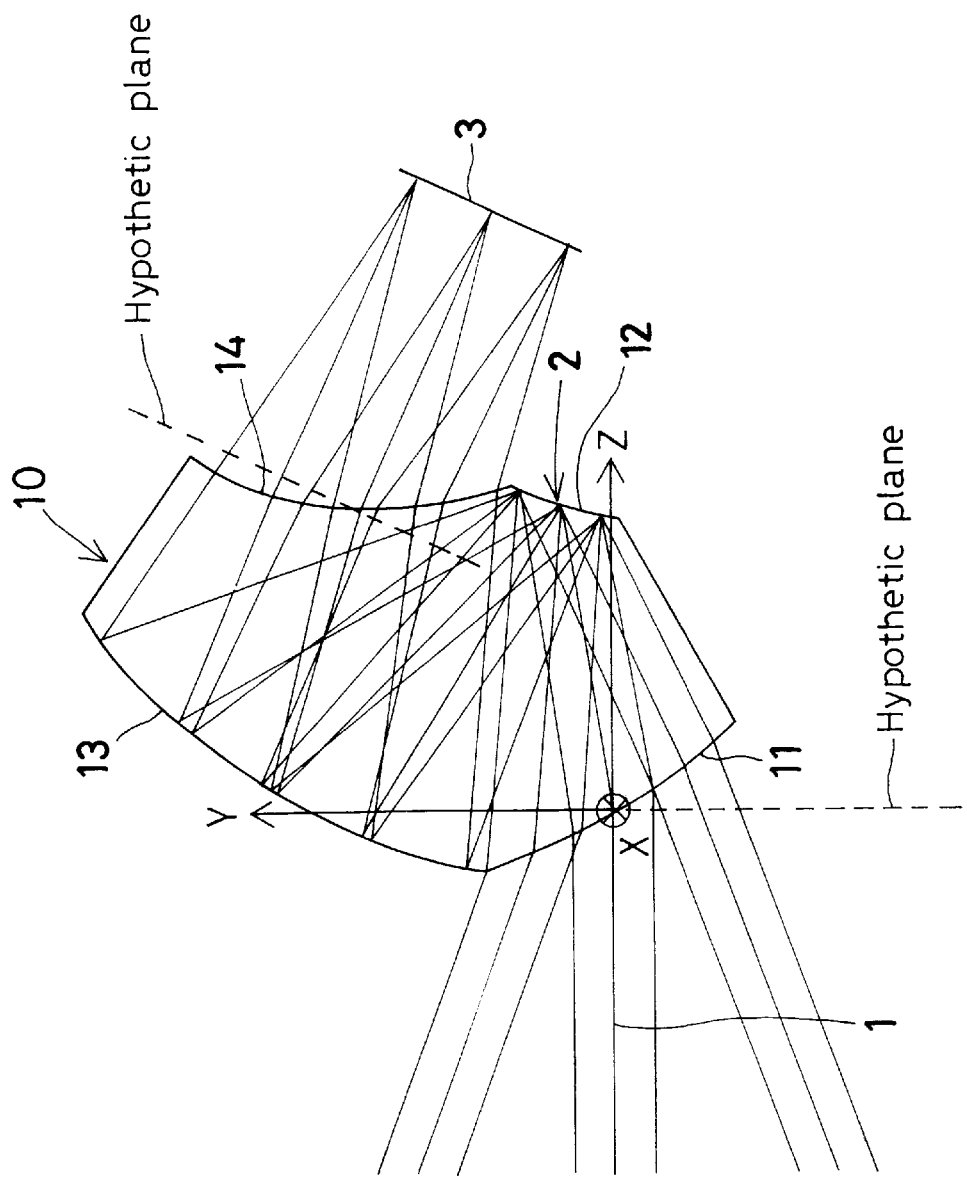
FIG. 1 is a sectional view of an image-forming optical system according to Example 1 of the present invention.

In each example, as shown in FIG. 1, an axial principal ray 1 is defined by a ray emanating from the center of an object and passing through the center of a stop 2 to reach the center of an image plane 3. A hypothetic plane is taken in the plane extending through the intersection between the axial principal ray 1 and the entrance surface (first surface) 11 of the prism member 10 at right angles to the axial principal ray 1 entering the entrance surface 11. Another hypothetic plane is taken in the plane extending through the intersection between the axial principal ray 1 and the exit surface (fourth surface) 14 of the prism member 10 at right angles to the axial principal ray 1 exiting from the exit surface 14. The intersection of each hypothetic plane and the associated optical surface is defined as the origin for this optical surface and decentered optical surfaces present between it and the subsequent hypothetic plane (the image plane in the case of the final hypothetic plane). A positive direction of a Z-axis is taken in the direction of travel of the axial principal ray 1 (the axial principal ray 1 entering the entrance surface in the case of the hypothetic plane determined with respect to the intersection of the entrance surface; the axial principal ray 1 exiting from the exit surface in the case of the hypothetic plane determined with respect to the intersection of the exit surface). A plane containing the Z-axis and the center of the image plane 3 is defined as a YZ-plane. An axis extending through the origin at right angles to the YZ-plane is defined as an X-axis. The direction in which the X-axis extends from the obverse side toward the reverse side of the plane of the figure is defined as a positive direction of the X-axis. An axis that constitutes a right-handed orthogonal coordinate system in combination with the X- and Z-axes is defined as a Y-axis. FIG. 1 shows the hypothetic planes and a coordinate system concerning the hypothetic plane determined with respect to the intersection of the entrance surface 11 of the prism member 10. Illustration of the hypothetic planes and the coordinate system is omitted in FIGS. 2 and 3.

In Example 1 to 3, the decentration of each surface is made in the YZ-plane, and the one and only plane of symmetry of each rotationally asymmetric free-form surface is the YZ-plane.

Regarding decentered surfaces, each surface is given displacements in the X-, Y- and Z-axis directions (X, Y and Z, respectively) of the vertex position of the surface from the origin of the associated coordinate system, and tilt angles (degrees) of the center axis of the surface [the Z-axis of the above equation (a) in regard to free-form surfaces; the Z-axis of the following equation (b) in the case of aspherical surfaces] with respect to the X-, Y- and Z-axes ($\alpha$, $\beta$ and $\gamma$, respectively). In this case, positive $\alpha$ and $\beta$ mean counterclockwise rotation relative to the positive directions of the corresponding axes, and positive $\gamma$ means clockwise rotation relative to the positive direction of the Z-axis.

Among optical surfaces constituting the optical system in each example, a specific surface (including a hypothetic plane) and a surface subsequent thereto are given a surface separation when these surfaces form a coaxial optical system. In addition, the refractive index and Abbe's number of each medium are given according to the conventional method.

The configuration of each free-form surface used in the present invention is defined by the above equation (a). The Z-axis of the defining equation is the axis of the free-form surface.

In the constituent parameters (shown later), those terms concerning free-form surfaces and aspherical surfaces for which no data is shown are zero. The refractive index is expressed by the refractive index for the spectral d-line (wavelength: 587.56 nanometers). Lengths are given in millimeters.

Free-form surfaces may also be defined by Zernike polynomials. That is, the configuration of a free-form surface may be defined by the following equation (b). The Z-axis of the defining equation (b) is the axis of Zernike polynomial. A rotationally asymmetric surface is defined by polar coordinates of the height of the Z-axis with respect to the XY-plane. In the equation (b), A is the distance from the Z-axis in the XY-plane, and R is the azimuth angle about the Z-axis, which is expressed by the angle of rotation measured from the Z-axis.

$$x = R \times \cos(A)$$
$$y = R \times \sin(A)$$
$$Z = D_2 + D_3 R\cos(A) + D_4 R\sin(A) + D_5 R^2\cos(2A) +$$
$$D_6(R^2 - 1) + D_7 R^2\sin(2A) + D_8 R^3\cos(3A) +$$
$$D_9(3R^3 - 2R)\cos(A) + D_{10}(3R^3 - 2R)\sin(A) +$$
$$D_{11} R^3\sin(3A) + D_{12} R^4\cos(4A) +$$
$$D_{13}(4R^4 - 3R^2)\cos(2A) +$$
$$D_{14}(6R^4 - 6R^2 + 1) + D_{15}(4R^4 3R^2)\sin(2A) +$$
$$D_{16} R^4\sin(4A) + D_{17} R^5\cos(5A) +$$
$$D_{18}(5R^5 - 4R^3)\cos(3A) +$$
$$D_{19}(10R^5 - 12R^3 + 3R)\cos(A) +$$
$$D_{20}(10R^5 - 12R^3 + 3R)\sin(A) +$$
$$D_{21}(5R^5 - 4R^3)\sin(3A) + D_{22} R^5\sin(5A) +$$
$$D_{23} R^6\cos(6A) + D_{24}(6R^6 - 5R^4)\cos(4A) +$$
$$D_{25}(15R^6 - 20R^4 + 6R^2)\cos(2A) +$$
$$D_{26}(20R^6 - 30R^4 + 12R^2 - 1) +$$
$$D_{27}(15R^6 - 20R^4 + 6R^2)\sin(2A) +$$
$$D_{28}(6R^6 - 5R^4)\sin(4A) + D_{29} R^6\sin(6A)$$

In the above equation, to design an optical system symmetric with respect to the X-axis direction, $D_4$, $D_5$, $D_6$, $D_{10}$, $D_{11}$, $D_{12}$, $D_{13}$, $D_{14}$, $D_{20}$, $D_{21}$, $D_{22}$ ... should be used.

Other examples of surfaces usable in the present invention are expressed by the following defining equation (c):

$$Z = \Sigma\Sigma C_{nm} XY$$

Assuming that k=7 (polynomial of degree 7), for example, a free-form surface is expressed by an expanded form of the above equation as follows:

$$Z = C_2 + C_3 y + C_4|x| + C_5 y^2 + C_6 y|x| + C_7 x^2 + C_8 y^3 + \quad (c)$$
$$C_9 y^2|x| + C_{10} yx^2 + C_{11}|x^3| + C_{12} y^4 + C_{13} y^3|x| +$$
$$C_{14} y^2 x^2 + C_{15} y|x^3| + C_{16} x^4 + C_{17} y^5 + C_{18} y^4|x| +$$
$$C_{19} y^3 x^2 + C_{20} y^2|x^3| + C_{21} yx^4 + C_{22}|x^5| + C_{23} y^6 +$$
$$C_{24} y^5|x| + C_{25} y^4 x^2 + C_{26} y^3|x^3| + C_{27} y^2 x^4 + C_{28} y|x^5| +$$

-continued
$$C_{29} x^6 + C_{30} y^7 + C_{31} y^6|x| + C_{32} y^5 x^2 + C_{33} y^4|x^3| +$$
$$C_{34} y^3 x^4 + C_{35} y^2|x^5| + C_{36} yx^6 + C_{37}|x^7|$$

Although in the examples of the present invention the surface configuration is expressed by a free-form surface using the above equation (a), it should be noted that the same advantageous effect can be obtained by using the above equation (b) or (c).

Figure 2:
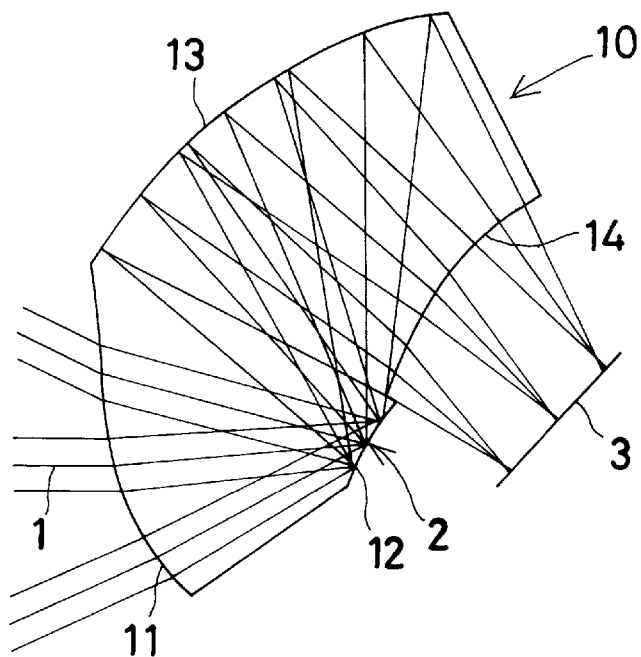
FIG. 2 is a sectional view of an image-forming optical system according to Example 2 of the present invention.
Figure 3:
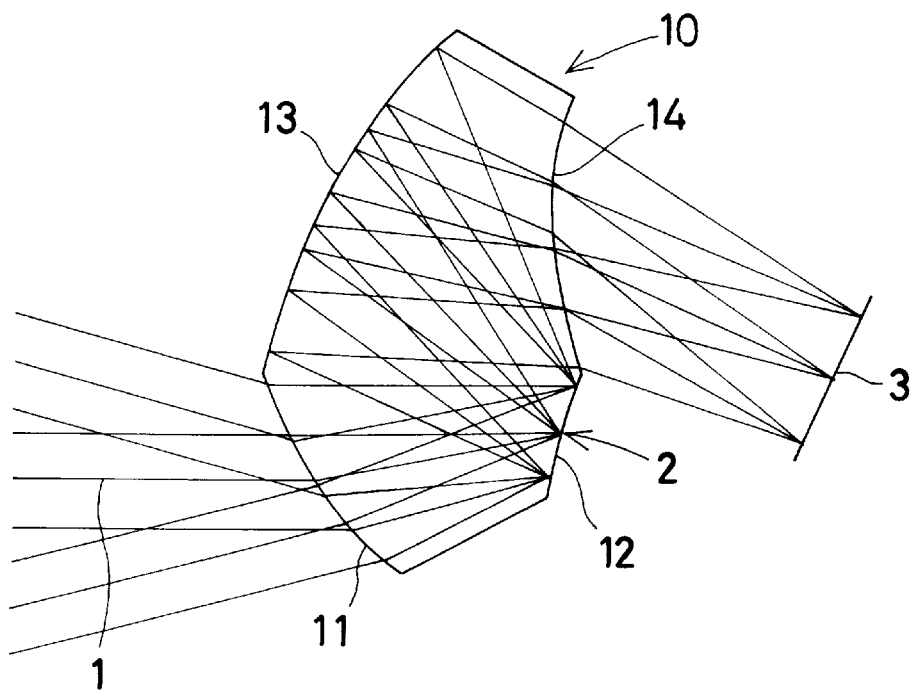
FIG. 3 is a sectional view of an image-forming optical system according to Example 3 of the present invention.

FIGS. 1 to 3 are sectional views of Examples 1 to 3, respectively, taken along the YZ-plane containing the axial principal ray. Constituent parameters of these examples will be shown later. In the constituent parameters, free-form surfaces are denoted by "FFS", and hypothetic planes by "HRP" (Hypothetic Reference Plane).

In all Examples 1 to 3, a prism member 10 is formed from a first surface 11, a second surface 12, a third surface 13, and a fourth surface 14. The first surface 11 is a first transmitting surface. The second surface 12 is a first reflecting surface. The third surface 13 is a second reflecting surface. The fourth surface 14 is a second transmitting surface. Rays from the object enter the prism member 10 through the first transmitting surface 11. The incident light is reflected by the first reflecting surface 12. The reflected light is reflected by the second reflecting surface 13. The reflected light exits from the prism member 10 through the second transmitting surface 14 and forms an image on an image plane 3. A stop 2 is provided to be coincident with the second surface 12.

In the constituent parameters (shown later), the displacements of each of the surface Nos. 2 to 6 are expressed by the amounts of displacement from the hypothetic plane 1 of surface No. 1. The image plane is expressed by only the surface separation along the axial principal ray from the hypothetic plane 2 of surface No. 6.

In Example 1, the horizontal half field angle is 26.3°, and the vertical half field angle is 20.3°. The entrance pupil diameter is 1.77 millimeters. Therefore, the F-number is 2.8. The image height is 4.8×3.6 millimeters. The focal length f is 4.96 millimeters, which is equivalent to 35 millimeters in terms of the focal length of a 35-mm camera.

In Example 2, the horizontal half field angle is 31.7°, and the vertical half field angle is 24.9°. The entrance pupil diameter is 1.42 millimeters. Therefore, the F-number is 2.8. The image height is 4.8×3.6 millimeters. The focal length f is 3.97 millimeters, which is equivalent to 28 millimeters in terms of the focal length of a 35-mm camera.

In Example 3, the horizontal half field angle is 19.1°, and the vertical half field angle is 14.6°. The entrance pupil diameter is 2.53 millimeters. Therefore, the F-number is 2.8. The image height is 4.8×3.6 millimeters. The focal length f is 7.08 millimeters, which is equivalent to 50 millimeters in terms of the focal length of a 35-mm camera.

The image-forming optical system according to the present invention can be applied to other sizes, as a matter of course. The present invention includes not only an image pickup optical system using the image-forming optical system according to the present invention but also an image pickup apparatus incorporating the image pickup optical system.

Constituent parameters in the foregoing Examples 1 to 3 are shown below. In the tables below: "FFS" denotes a free-form surface, and "HRP" denotes a hypothetic plane.

EXAMPLE 1

| Surface No. | Radius of curvature | Surface separation | Displacement and tilt | Refractive index | Abbe's No. |
|---|---|---|---|---|---|
| Object plane | ∞ | ∞ | | | |
| 1 | ∞ (HRF 1) | | | | |
| 2 | FFS ① | | (1) | 1.4924 | 81.8 |
| 3 | FFS ② (Stop) | | (2) | 1.4924 | 81.8 |
| 4 | FFS ③ | | (3) | 1.4924 | 81.8 |
| 5 | FFS ④ | | (4) | | |
| 6 | ∞ (HRP2) | 7.20 | (5) | | |
| Image plane | | | | | |

FFS ①
R   7.9788
$C_4$  $-9.9975 \times 10^{-2}$   $C_6$  $-3.3573 \times 10^{-2}$   $C_8$  $1.2515 \times 10^{-3}$
$C_{10}$  $-2.3983 \times 10^{-3}$   $C_{11}$  $-3.1868 \times 10^{-4}$   $C_{13}$  $-5.9442 \times 10^{-4}$
$C_{15}$  $-3.4746 \times 10^{-4}$
FFS ②
R   36.9986
$C_4$  $1.3729 \times 10^{-2}$   $C_6$  $3.7949 \times 10^{-2}$   $C_8$  $-2.1420 \times 10^{-3}$
$C_{10}$  $-1.9111 \times 10^{-3}$   $C_{11}$  $1.3431 \times 10^{-4}$   $C_{13}$  $8.6600 \times 10^{-4}$
$C_{15}$  $4.0712 \times 10^{-4}$
FFS ③
R   $-14.2562$
$C_4$  $1.1393 \times 10^{-3}$   $C_6$  $9.4315 \times 10^{-4}$   $C_8$  $-5.3041 \times 10^{-5}$
$C_{10}$  $1.2018 \times 10^{-4}$   $C_{11}$  $-3.7278 \times 10^{-6}$   $C_{13}$  $-2.9645 \times 10^{-5}$
$C_{15}$  $-1.5701 \times 10^{-5}$
FFS ④
R   23.8738
$C_4$  $5.0046 \times 10^{-2}$   $C_6$  $3.3822 \times 10^{-2}$   $C_8$  $-3.5830 \times 10^{-3}$
$C_{10}$  $2.8875 \times 10^{-3}$   $C_{11}$  $4.5834 \times 10^{-4}$   $C_{13}$  $2.6323 \times 10^{-3}$
$C_{15}$  $6.2706 \times 10^{-4}$

| | Displacement and tilt(1) | | | | |
|---|---|---|---|---|---|
| X | 0.00 | Y | 0.00 | Z | 6.17 |
| α | 28.17 | β | 0.00 | γ | 0.00 |
| | Displacement and tilt(2) | | | | |
| X | 0.00 | Y | 1.16 | Z | 12.97 |
| α | $-17.58$ | β | 0.00 | γ | 0.00 |
| | Displacement and tilt(3) | | | | |
| X | 0.00 | Y | 7.51 | Z | 6.60 |
| α | 149.35 | β | 0.00 | γ | 0.00 |
| | Displacement and tilt(4) | | | | |
| X | 0.00 | Y | 5.65 | Z | 12.90 |
| α | $-1.36$ | β | 0.00 | γ | 0.00 |
| | Displacement and tilt(5) | | | | |
| X | 0.00 | Y | 5.65 | Z | 12.90 |
| α | $-24.16$ | β | 0.00 | γ | 0.00 |

EXAMPLE 2

| Surface No. | Radius of curvature | Surface separation | Displacement and tilt | Refractive index | Abbe's No. |
|---|---|---|---|---|---|
| Object plane | ∞ | ∞ | | | |
| 1 | ∞ (HRP1) | | | | |
| 2 | FFS ① | | (1) | 1.4924 | 81.8 |
| 3 | FFS ② (Stop) | | (2) | 1.4924 | 81.8 |
| 4 | FFS ③ | | (3) | 1.4924 | 81.8 |
| 5 | FFS ④ | | (4) | | |
| 6 | ∞ (HRP2) | 4.71 | (5) | | |
| Image plane | ∞ | | | | |

FFS ①
R   9.1892
$C_4$  $-1.0834 \times 10^{-1}$   $C_6$  $-3.4489 \times 10^{-3}$   $C_8$  $2.1849 \times 10^{-3}$
$C_{10}$  $-4.0631 \times 10^{-3}$   $C_{11}$  $-8.4242 \times 10^{-4}$   $C_{13}$  $1.6661 \times 10^{-4}$
$C_{15}$  $-2.8148 \times 10^{-4}$
FFS ②
R   34.1348
$C_4$  $4.1696 \times 10^{-3}$   $C_5$  $3.9862 \times 10^{-2}$   $C_8$  $-1.7889 \times 10^{-3}$
$C_{10}$  $-2.5822 \times 10^{-3}$   $C_{11}$  $-3.7668 \times 10^{-5}$   $C_{13}$  $1.1071 \times 10^{-3}$
$C_{15}$  $-4.2278 \times 10^{-3}$
FFS ③
R   $-13.1120$
$C_4$  $5.0333 \times 10^{-3}$   $C_6$  $3.2030 \times 10^{-3}$   $C_8$  $1.3975 \times 10^{-4}$
$C_{10}$  $7.2872 \times 10^{-5}$   $C_{11}$  $2.5251 \times 10^{-5}$   $C_{13}$  $3.1122 \times 10^{-5}$
$C_{15}$  $-9.3962 \times 10^{-7}$
FFS ④
R   $-14.6648$
$C_4$  $1.3687 \times 10^{-1}$   $C_6$  $8.1673 \times 10^{-2}$   $C_8$  $-1.9479 \times 10^{-3}$
$C_{10}$  $3.4536 \times 10^{-3}$   $C_{11}$  $-2.8276 \times 10^{-4}$   $C_{13}$  $1.9933 \times 10^{-3}$
$C_{15}$  $-5.5511 \times 10^{-5}$

| | Displacement and tilt(1) | | | | |
|---|---|---|---|---|---|
| X | 0.00 | Y | 0.00 | Z | 1.44 |
| α | 18.16 | β | 0.00 | γ | 0.00 |
| | Displacement and tilt(2) | | | | |
| X | 0.00 | Y | 0.73 | Z | 8.31 |
| α | $-29.01$ | β | 0.00 | γ | 0.00 |
| | Displacement and tilt(3) | | | | |
| X | 0.00 | Y | 9.46 | Z | 4.08 |
| α | 128.45 | β | 0.00 | γ | 0.00 |
| | Displacement and tilt(4) | | | | |
| X | 0.00 | Y | 4.62 | Z | 10.06 |
| α | $-32.19$ | β | 0.00 | γ | 0.00 |
| | Displacement and tilt(5) | | | | |
| X | 0.00 | Y | 4.62 | Z | 10.06 |
| α | $-42.33$ | β | 0.00 | γ | 0.00 |

EXAMPLE 3

| Surface No. | Radius of curvature | Surface separation | Displacement and tilt | Refractive index | Abbe's No. |
|---|---|---|---|---|---|
| Object plane | ∞ | ∞ | | | |
| 1 | ∞ (HRF1) | | | | |
| 2 | FFS ① | | (1) | 1.4924 | 81.8 |
| 3 | FFS ② (Stop) | | (2) | 1.4924 | 81.8 |
| 4 | FFS ③ | | (3) | 1.4924 | 81.8 |
| 5 | FFS ④ | | (4) | | |
| 6 | ∞ (HRP 2) | 8.25 | (5) | | |
| Image plane | | | | | |

FFS ①
R   8.6333
$C_4$  $6.4778 \times 10^{-2}$   $C_6$  $2.8320 \times 10^{-2}$   $C_8$  $-1.1809 \times 10^{-4}$
$C_{10}$  $-2.5662 \times 10^{-3}$   $C_{11}$  $-2.9623 \times 10^{-4}$   $C_{13}$  $-4.1338 \times 10^{-4}$
$C_{15}$  $-1.8251 \times 10^{-4}$
FFS ②
R   53.0552
$C_4$  $1.4685 \times 10^{-2}$   $C_6$  $2.7364 \times 10^{-2}$   $C_8$  $-1.6258 \times 10^{-3}$
$C_{10}$  $-2.2156 \times 10^{-3}$   $C_{11}$  $6.5683 \times 10^{-5}$   $C_{13}$  $7.6575 \times 10^{-4}$
$C_{15}$  $2.4536 \times 10^{-4}$
FFS ③
R   $-14.9591$
$C_4$  $2.0093 \times 10^{-3}$   $C_6$  $2.1687 \times 10^{-3}$   $C_8$  $-1.0307 \times 10^{-4}$
$C_{10}$  $3.6479 \times 10^{-5}$   $C_{11}$  $-1.1352 \times 10^{-5}$   $C_{13}$  $-6.0450 \times 10^{-5}$
$C_{15}$  $-8.5671 \times 10^{-6}$
FFS ④
R   35.2040
$C_4$  $3.0501 \times 10^{-2}$   $C_6$  $3.3744 \times 10^{-2}$   $C_8$  $-2.0778 \times 10^{-3}$
$C_{10}$  $4.1767 \times 10^{-4}$   $C_{11}$  $3.5757 \times 10^{-4}$   $C_{13}$  $1.9081 \times 10^{-3}$
$C_{15}$  $3.2298 \times 10^{-4}$

|   | Displacement and tilt(1) | | | | |
|---|---|---|---|---|---|
| X | 0.00 | Y | 0.00 | Z | 5.65 |
| α | 36.27 | β | 0.00 | γ | 0.00 |
|   | Displacement and tilt(2) | | | | |
| X | 0.00 | Y | 1.63 | Z | 12.74 |
| α | −15.51 | β | 0.00 | γ | 0.00 |
|   | Displacement and tilt(3) | | | | |
| X | 0.00 | Y | 7.40 | Z | 6.75 |
| α | 152.74 | β | 0.00 | γ | 0.00 |
|   | Displacement and tilt(4) | | | | |
| X | 0.00 | Y | 6.35 | Z | 12.3 5 |
| α | 7.31 | β | 0.00 | γ | 0.00 |
|   | Displacement and tilt(5) | | | | |
| X | 0.00 | Y | 6.35 | Z | 12.35 |
| α | −19.97 | β | 0.00 | γ | 0.00 |

Figure 4:
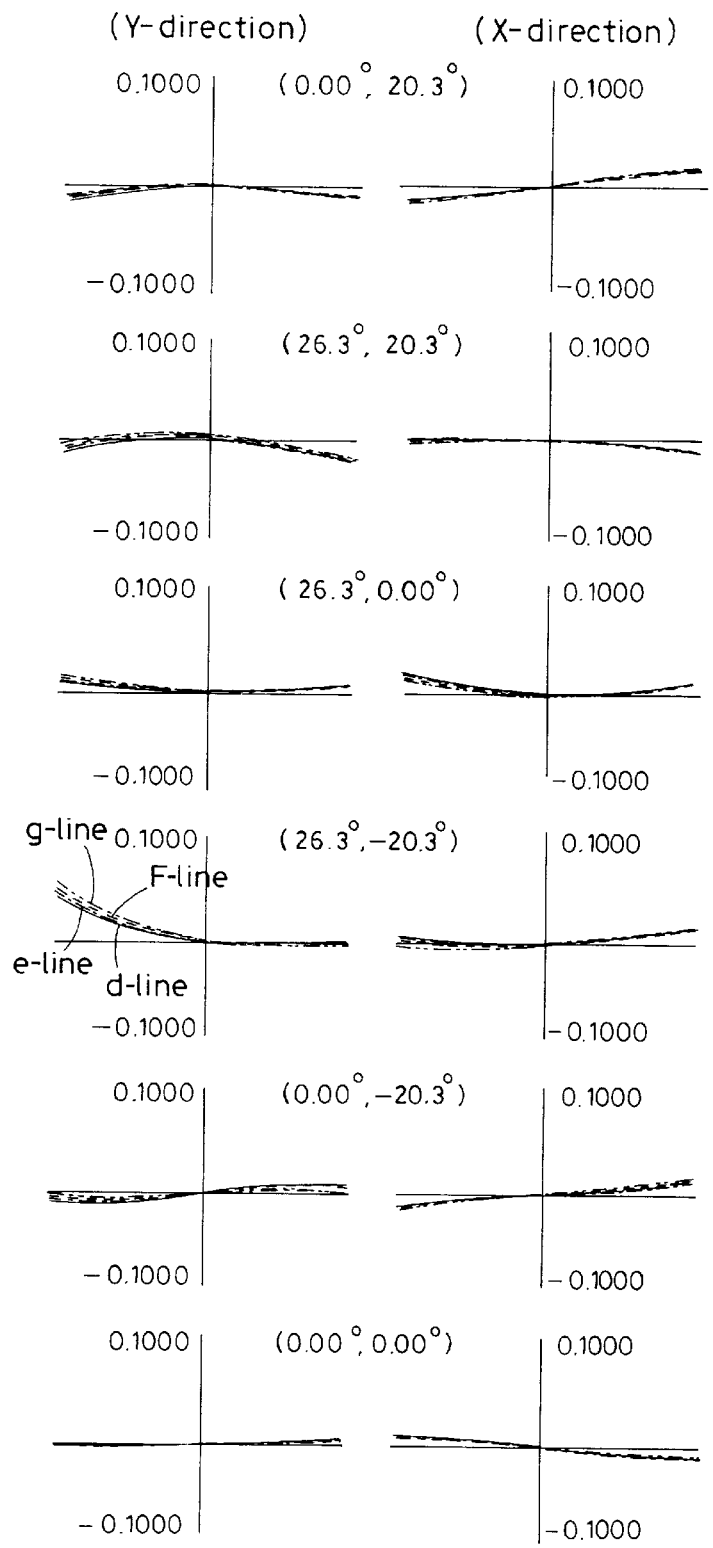
FIG. 4 is an aberrational diagram showing lateral aberrations in the image-forming optical system according to Example 1.
Figure 5:
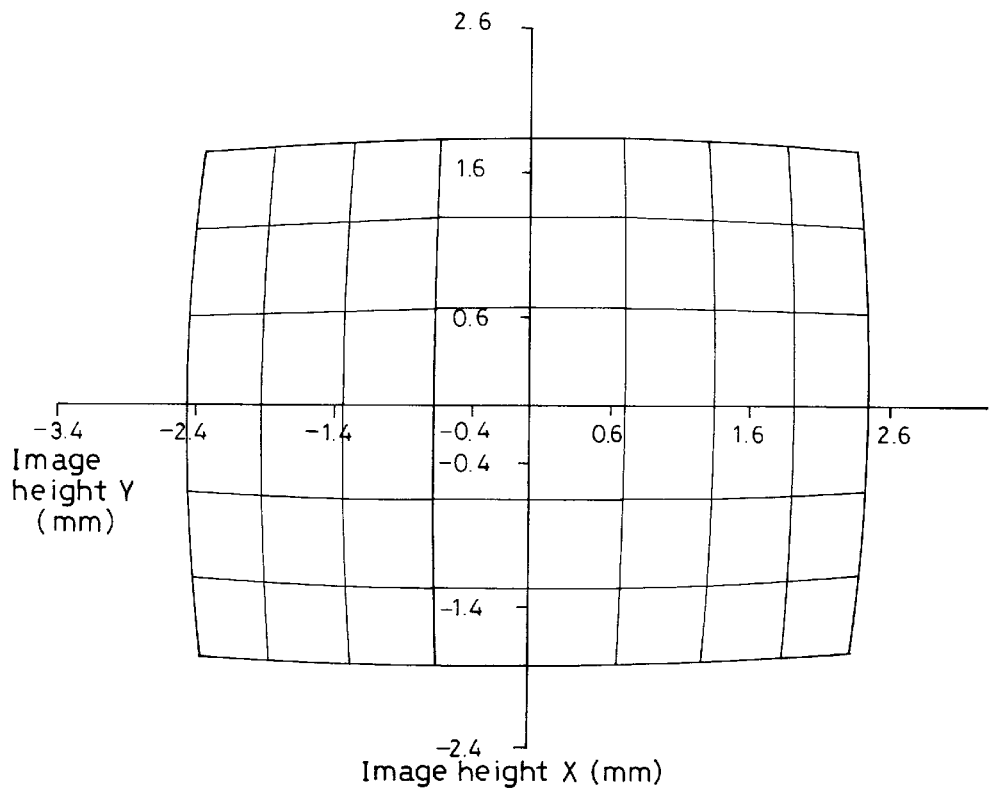
FIG. 5 is a diagram showing distortion in Example 1.

FIG. 4 is an aberrational diagram showing lateral aberrations in the above-described Example 1. In the diagram showing lateral aberrations, the numerals in the parentheses denote [horizontal (X-direction) field angle, vertical (Y-direction) field angle], and lateral aberrations at the field angles are shown. FIG. 5 shows distortion in the above-described Example 1.

The values concerning the conditions (1) to (6) in the above-described Examples 1 to 3 are as follows:

|   | Example 1 | Example 2 | Example 3 |
|---|---|---|---|
| (1) | −0.903 | −0.567 | −0.940 |
| (2) | −1.630 | −1.538 | −1.877 |
| (3) | 1.125 | 0.997 | 1.381 |
| (4) | 1.081 | 0.986 | 1.338 |
| (5) | 27.30° | 35.12° | 28.43° |
| (6) | 14.23° | 12.58° | 16.68° |

Incidentally, the above-described image-forming optical system according to the present invention can be used in photographic apparatus, particularly in cameras, in which an object image formed by the image-forming optical system is received with an image pickup device, such as a CCD or a silver halide film, to take a photograph of the object. It is also possible to use the image-forming optical system as an objective optical system of an observation apparatus in which an object image is viewed through an ocular lens, particularly a finder unit of a camera. The image-forming optical system according to the present invention is also usable as an image pickup optical system for optical apparatus using a small-sized image pickup device, e.g. endoscopes. Embodiments in which the present invention is applied to such apparatuses will be described below.

Figure 6:
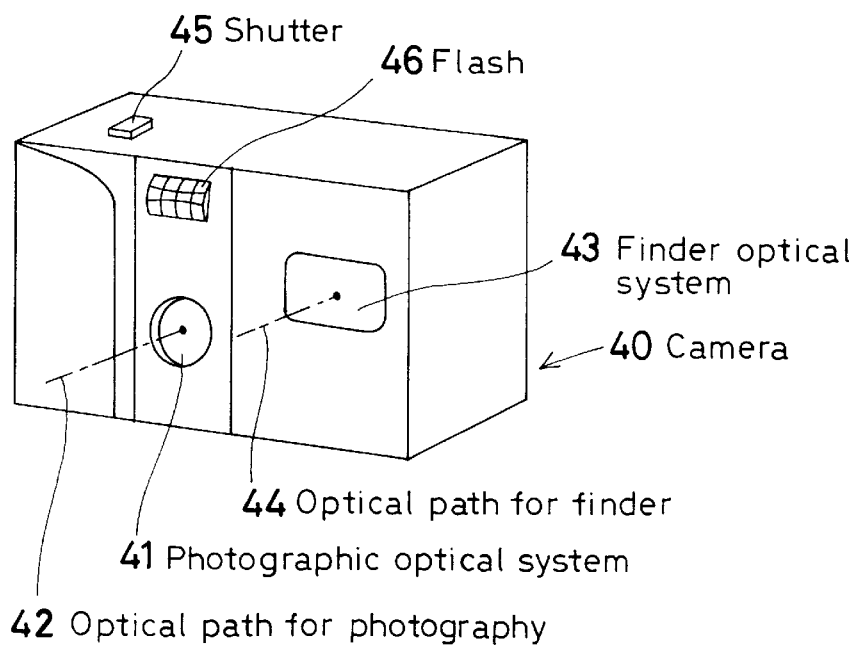
FIG. 6 is a perspective view showing the external appearance of an electronic camera to which an image-forming optical system according to the present invention is applied, as viewed from the front side thereof.
Figure 7:
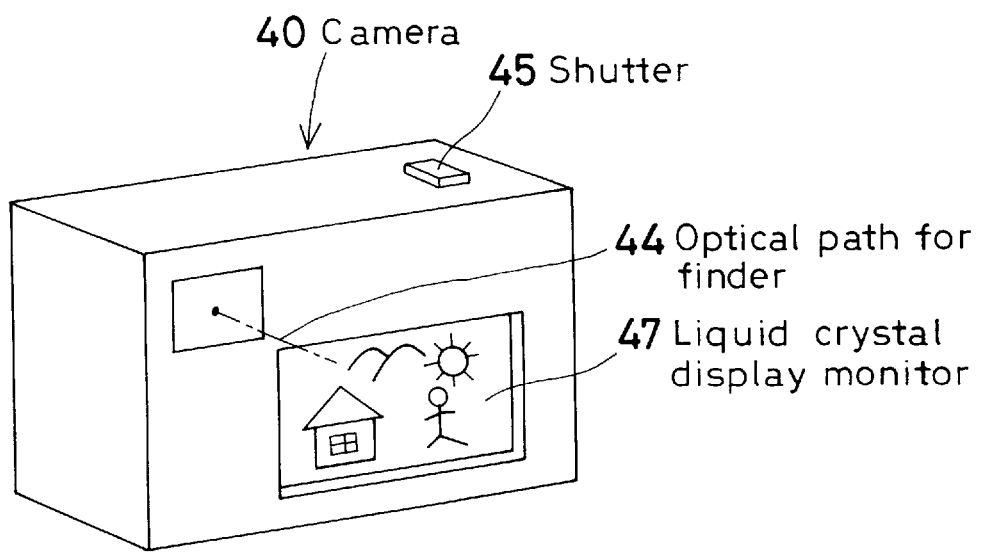
FIG. 7 is a perspective view of the electronic camera shown in FIG. 6, as viewed from the rear side thereof.
Figure 8:
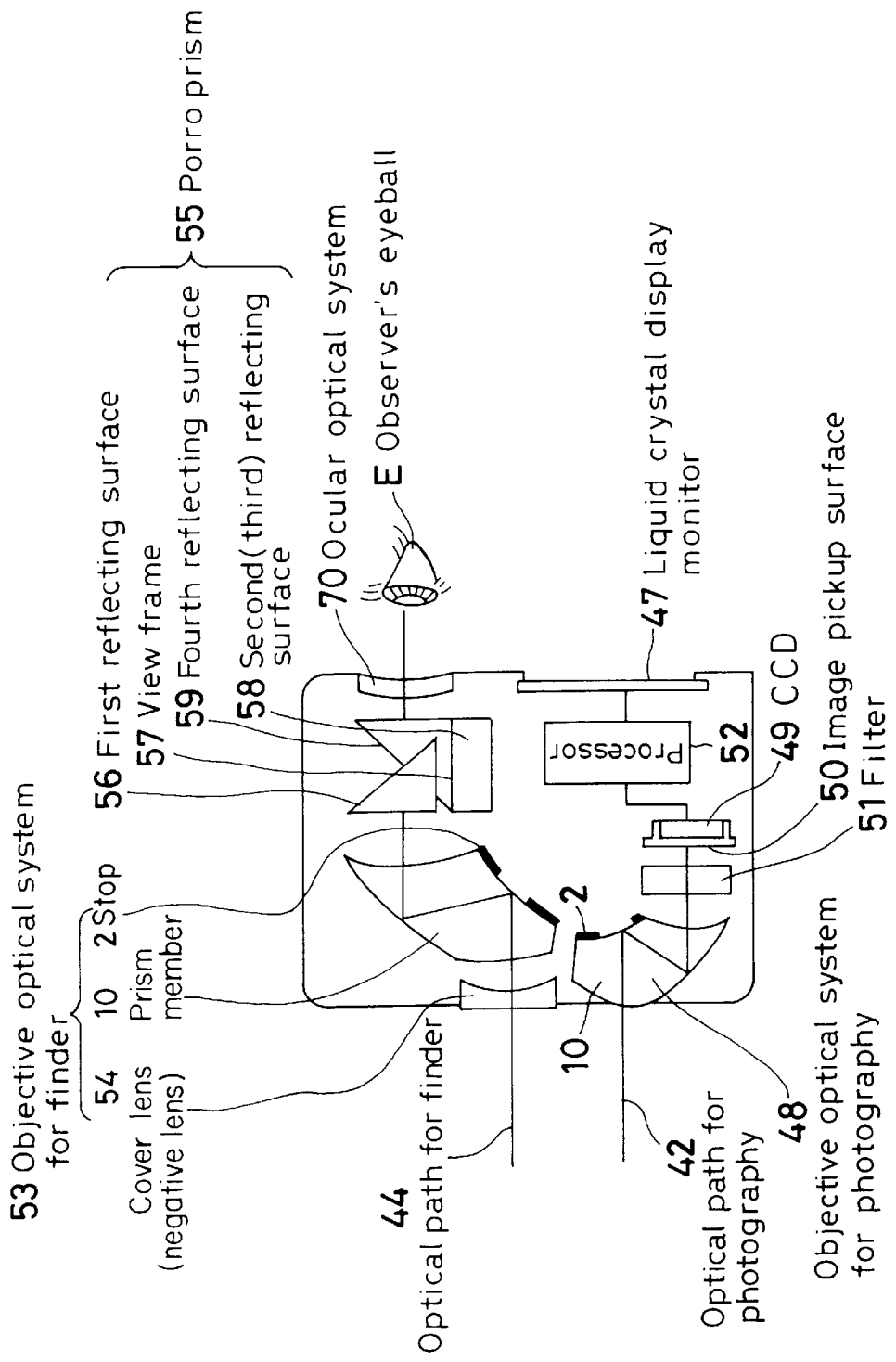
FIG. 8 is a sectional view showing the arrangement of the electronic camera in FIG. 6.

FIGS. 6 to 8 are conceptual views showing an arrangement in which the image-forming optical system according to the present invention is incorporated into an electronic camera as an objective optical system of a finder unit and also as an objective optical system for photography. FIG. 6 is a perspective view showing the external appearance of an electronic camera 40 as viewed from the front side thereof. FIG. 7 is a perspective view of the electronic camera 40 as viewed from the rear side thereof. FIG. 8 is a sectional view showing the arrangement of the electronic camera 40. In the illustrated example, the electronic camera 40 includes a photographic optical system 41 having an optical path 42 for photography, a finder optical system 43 having an optical path 44 for the finder, a shutter 45, a flash 46, a liquid crystal display monitor 47, etc. When the shutter 45, which is placed on the top of the camera 40, is depressed, photography is performed through an objective optical system 48 for photography. An object image produced by the objective optical system 48 for photography is formed on an image pickup surface 50 of a CCD 49 through a filter 51, e.g. a low-pass filter or an infrared cutoff filter. The object image received by the CCD 49 is processed in a processor 52 and displayed as an electronic image on the liquid crystal display monitor 47, which is provided on the rear of the camera 40. The processor 52 is provided with a memory or the like to enable the photographed electronic image to be recorded. It should be noted that the memory may be provided separately from the processor 52. The arrangement may also be such that the photographed electronic image is electronically recorded or written on a floppy disk or the like. The camera may be arranged in the form of a silver halide camera in which a silver halide film is disposed in place of the CCD 49.

Furthermore, an image-forming optical system according to the present invention is placed in the optical path 44 for the finder as an objective optical system 53 for the finder. In this case, a cover lens 54 having a negative power is provided as a cover member to form a part of the objective optical system 53, thereby enlarging the field angle. An object image produced by the objective optical system 53 for the finder is formed on a view frame 57 of a Porro prism 55, which is an image-erecting member. It should be noted that the view frame 57 is placed between a first reflecting surface 56 and second (third) reflecting surface 58 of the Porro prism 55. An ocular optical system 70 is placed behind a fourth reflecting surface 59 of the Porro prism 55 to lead an erect image to an observer's eyeball E.

In the camera 40, which is arranged as stated above, the objective optical system 53 for the finder can be constructed with a minimal number of optical members. Accordingly, a high-performance and low-cost camera can be realized. In addition, because the optical path of the objective optical system 53 can be folded, the degree of freedom with which the constituent elements can be arranged in the camera increases. This is favorable for design.

Although no mention is made of the arrangement of the objective optical system 48 for photography in the electronic camera 40 shown in FIG. 8, it should be noted that an image-forming optical system according to the present invention is placed as the objective optical system 48 for photography as in the case of the objective optical system 53 for the finder. In this case, no cover member is provided. It should be noted that the objective optical system 48 for photography may be formed by using a conventional refracting coaxial optical system.

Figure 9:
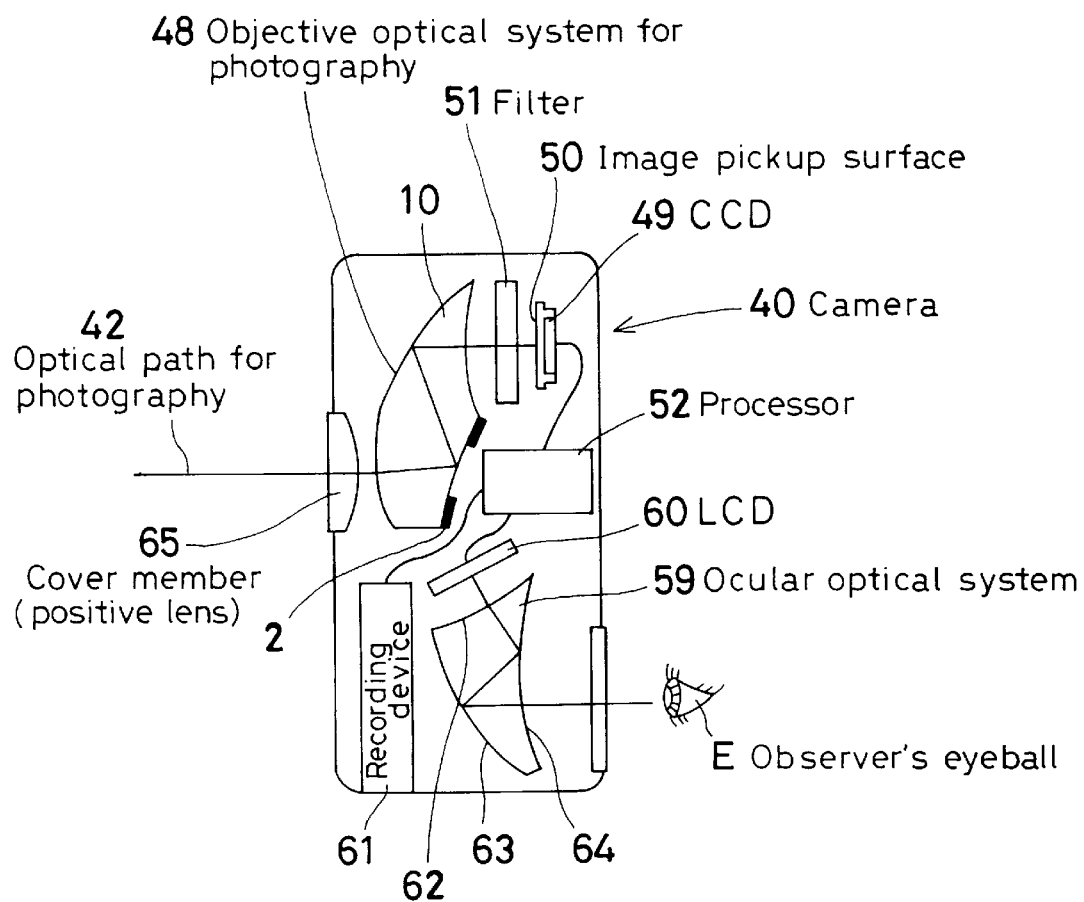
FIG. 9 is a conceptual view of another electronic camera to which an image-forming optical system according to the present invention is applied.

FIG. 9 is a conceptual view showing an arrangement in which an image-forming optical system according to the present invention is incorporated into an objective optical system 48 in a photography part of an electronic camera 40. In this example, an image-forming optical system according to the present invention is used in the objective optical system 48 for photography, which is placed in an optical path 42 for photography. An object image produced by the objective optical system 48 for photography is formed on an image pickup surface 50 of a CCD 49 through a filter 51, e.g. a low-pass filter or an infrared cutoff filter. The object image received by the CCD 49 is processed in a processor 52 and displayed in the form of an electronic image on a liquid crystal display device (LCD) 60. The processor 52 also controls a recording device 61 for recording the object image detected by the CCD 49 in the form of electronic information. The image displayed on the LCD 60 is led to an observer's eyeball E through an ocular optical system 59.

The ocular optical system 59 is formed from a decentered prism similar to that used in the image-forming optical system according to the present invention. In this example, the ocular optical system 59 has three surfaces, i.e. an entrance surface 62, a reflecting surface 63, and a surface 64 serving as both reflecting and refracting surfaces. At least one of the two reflecting surfaces 63 and 64, preferably each of them, is formed from a plane-symmetry free-form surface with only one plane of symmetry that gives a power to a light beam and corrects aberrations due to decentration. The only one plane of symmetry is formed in approximately the same plane as the only one plane of symmetry of the plane-symmetry free-form surfaces in the prism member 10 provided in the objective optical system 48 for photography. The objective optical system 48 for photography may include another lens (positive or negative lens) as a constituent element at a position on the object or image side of the prism member 10 (in the case of the illustrated example, the objective optical system 48 for photography includes a positive lens as a cover member 65 placed on the object side of the prism member 10).

In the camera 40 arranged as stated above, the objective optical system 48 for photography can be constructed with a minimal number of optical members.

Accordingly, a high-performance and low-cost camera can be realized. In addition, because all the constituent elements of the optical system can be arranged in the same plane, it is possible to reduce the thickness in a direction perpendicular to the plane in which the constituent elements are arranged.

Although in this example a positive lens is placed as a cover member 65 of the objective optical system 48 for photography, it is also possible to use a negative lens as the cover member 65 as in the case of the above-described example. A plane-parallel plate is also usable as the cover member 65.

The surface closest to the object side in the image-forming optical system according to the present invention may be used as a cover member instead of providing a cover member separately. In this example, the entrance surface of the prism member 10 is the closest to the object side in the image-forming optical system. In such a case, however, because the entrance surface is decentered with respect to the optical axis, if this surface is placed on the front side of the camera 40, it gives the illusion that the photographic center of the camera 40 is deviated from the subject when the entrance surface is seen from the subject side (the subject normally feels that photographing is being performed in a direction perpendicular to the entrance surface, as in the case of ordinary cameras). Thus, the entrance surface would give a sense of incongruity. Therefore, in a case where the surface of the image-forming optical system that is closest to the object side is a decentered surface as in this example, it is desirable to provide the cover member 65 from the viewpoint of preventing the subject from feeling incongruous when seeing the entrance surface, and allowing the subject to be photographed with the same feeling as in the case of the existing cameras.

Figure 10A:
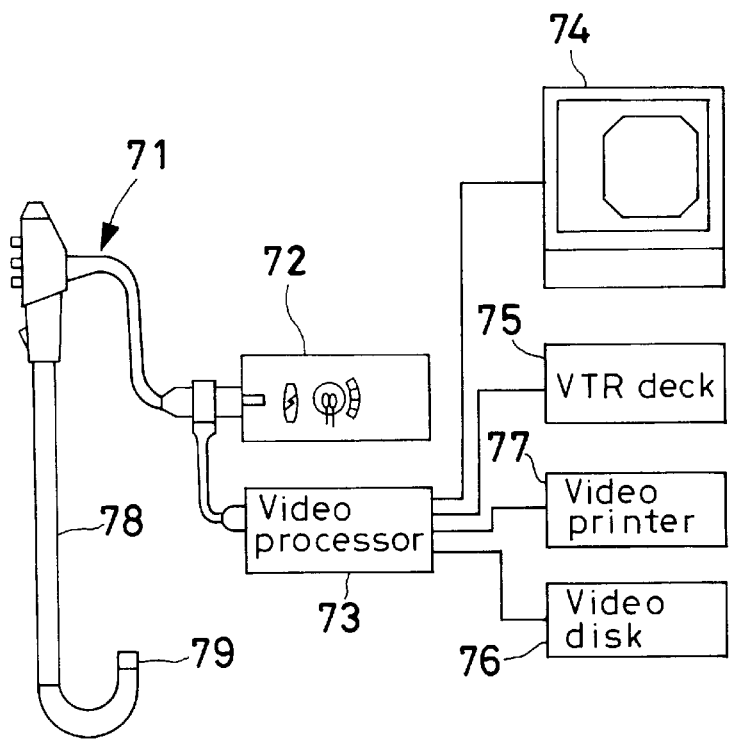
FIGS. 10(a) and 10(b) are conceptual views of a video endoscope system to which an image-forming optical system according to the present invention is applied.
Figure 10B:
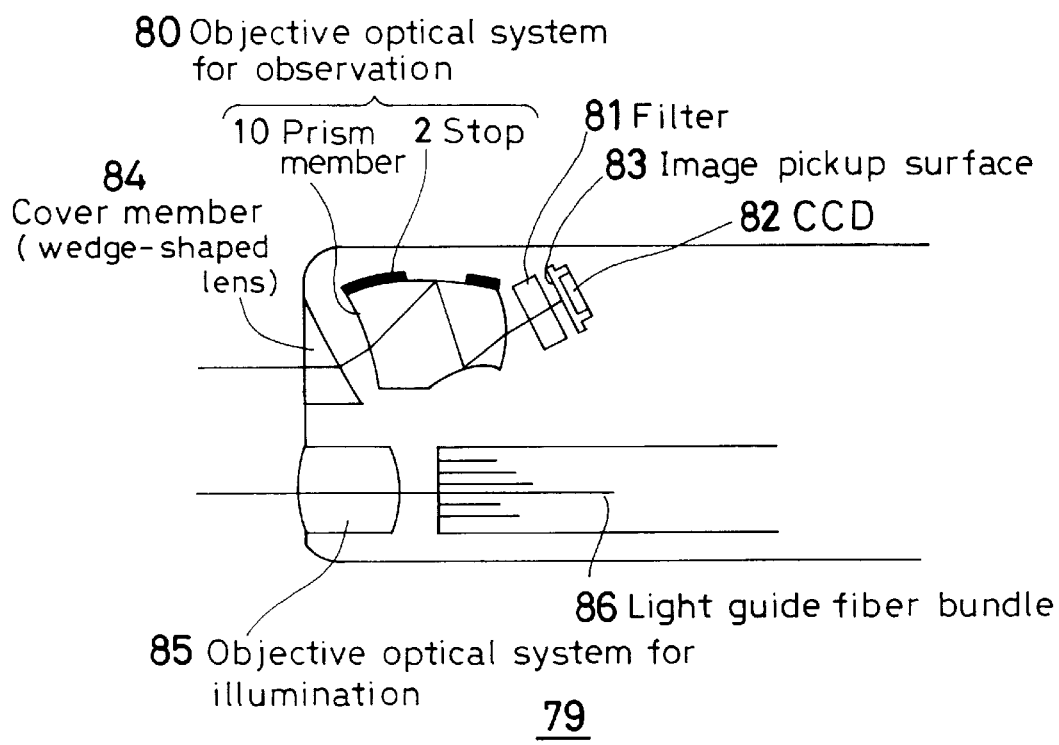
Figure 11:
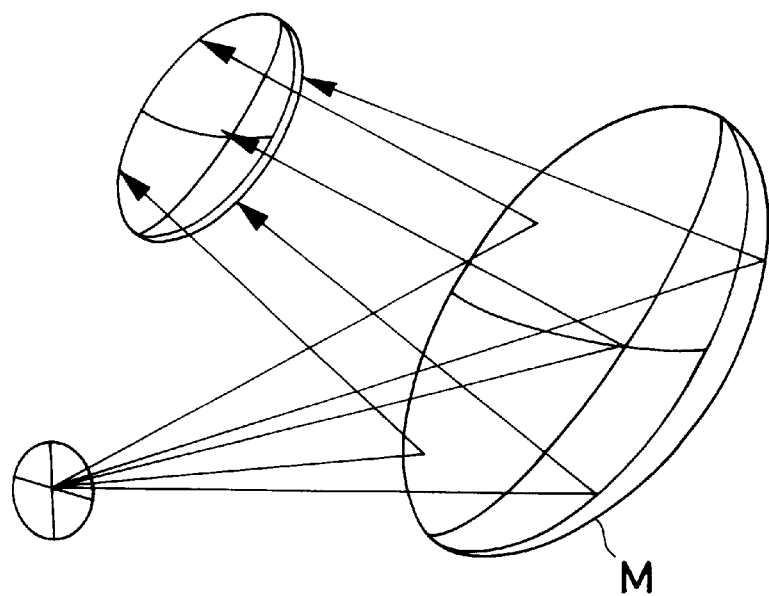
FIG. 11 is a conceptual view for describing curvature of field produced by a decentered reflecting surface.
Figure 12:
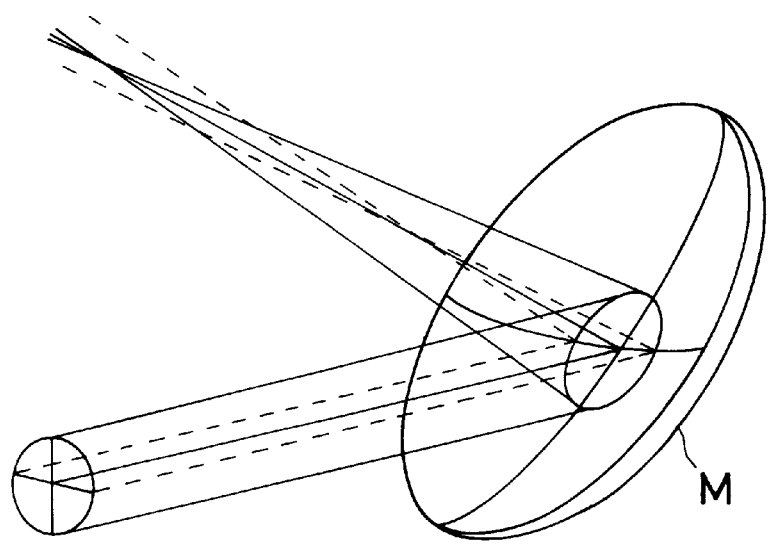
FIG. 12 is a conceptual view for describing astigmatism produced by a decentered reflecting surface.
Figure 13:
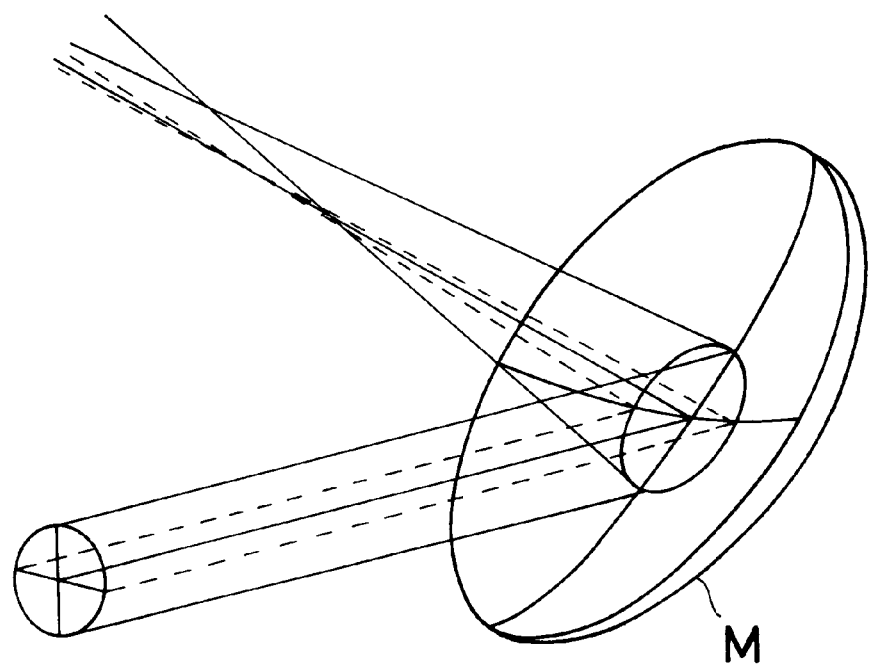
FIG. 13 is a conceptual view for describing coma produced by a decentered reflecting surface.

FIG. 10 is a conceptual view showing an arrangement in which an image-forming optical system according to the present invention is incorporated into an objective optical system 80 in an observation system of a video endoscope system. As shown in part (a) of FIG. 10, the video endoscope system includes a video endoscope 71, a light source unit 72 for supplying illuminating light, a video processor 73 for executing processing of signals associated with the video endoscope 71, a monitor 74 for displaying video signals outputted from the video processor 73, a VTR deck 75 and a video disk 76, which are connected to the video processor 73 to record video signals and so forth, and a video printer 77 for printing out video signals in the form of images. The video endoscope 71 has an insert part 78 with a distal end portion 79. The distal end portion 79 is arranged as shown in part (b) of FIG. 10. A light beam from the light source unit 72 passes through a light guide fiber bundle 86 and illuminates a part to be observed through an objective optical system 85 for illumination. Light from the part to be observed enters an objective optical system 80 for observation through a cover member 84 formed from a wedge-shaped lens (prism). Thus, an object image is formed by the objective optical system 80. The object image is formed on an image pickup surface 83 of a CCD 82 through a filter 81, e.g. a low-pass filter or an infrared cutoff filter. Furthermore, the object image is converted into a video signal by the CCD 82. The video signal is displayed directly on the monitor 74 by the video processor 73, which is shown in part (a) of FIG. 10. In addition, the video signal is recorded in the VTR deck 75 and on the video disk 76 and also printed out in the form of an image from the video printer 77.

The endoscope arranged as stated above can be constructed with a minimal number of optical members. Accordingly, a high-performance and low-cost endoscope can be realized. Moreover, because the prism member 10, which constitutes the objective optical system 80 of the observation system, extends in the direction of the longitudinal axis of the endoscope, the above-described advantageous effects can be obtained without hindering the achievement of a reduction in the diameter of the endoscope.

In this case also, the cover member 84 of the objective optical system 80 for observation may be not only a wedge-shaped lens but also a positive or negative lens or a plane-parallel plate.

Figure 14:
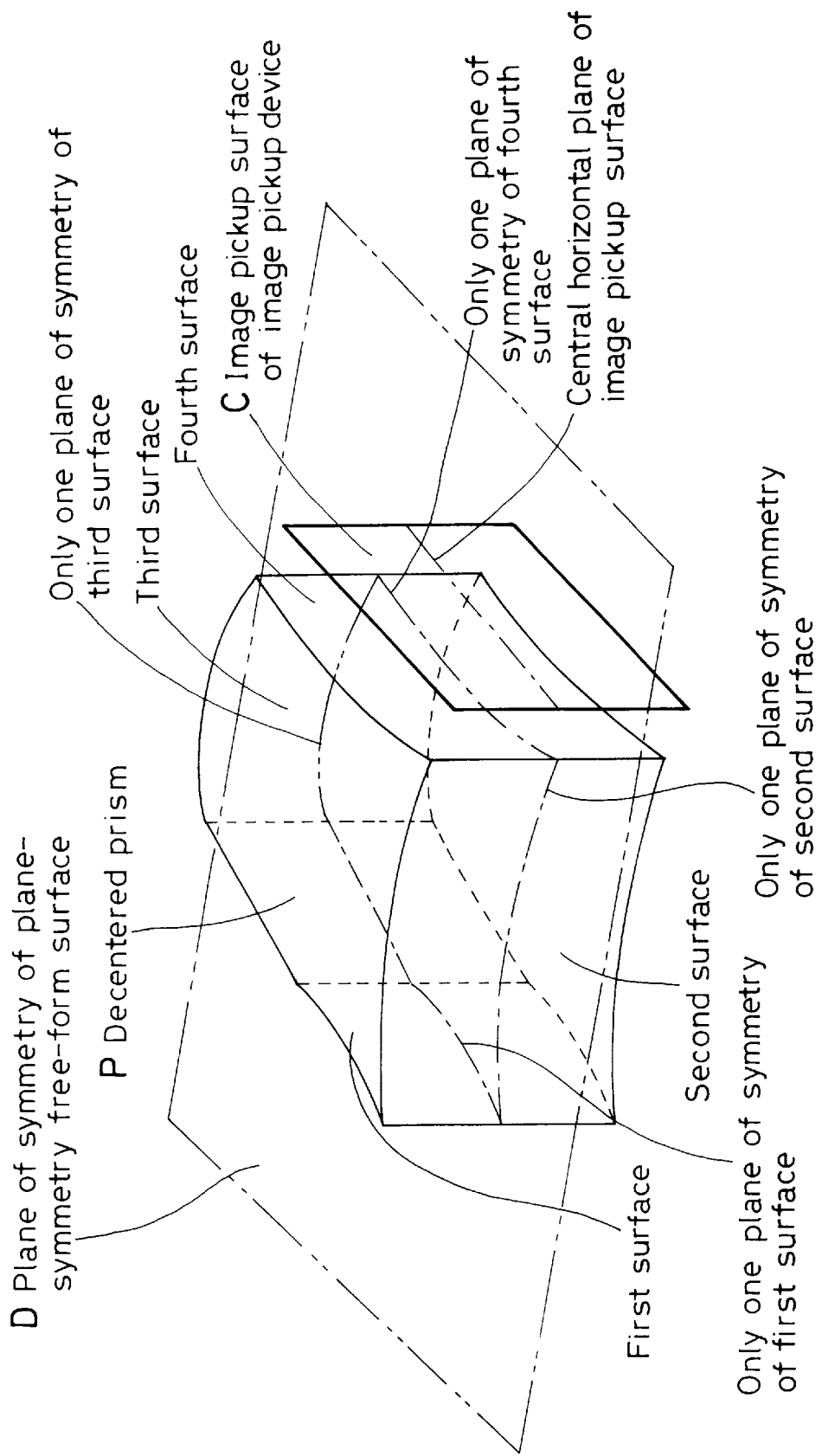
FIG. 14 is a diagram showing a desirable arrangement for an image-forming optical system according to the present invention when it is placed in front of an image pickup device.
Figure 15:
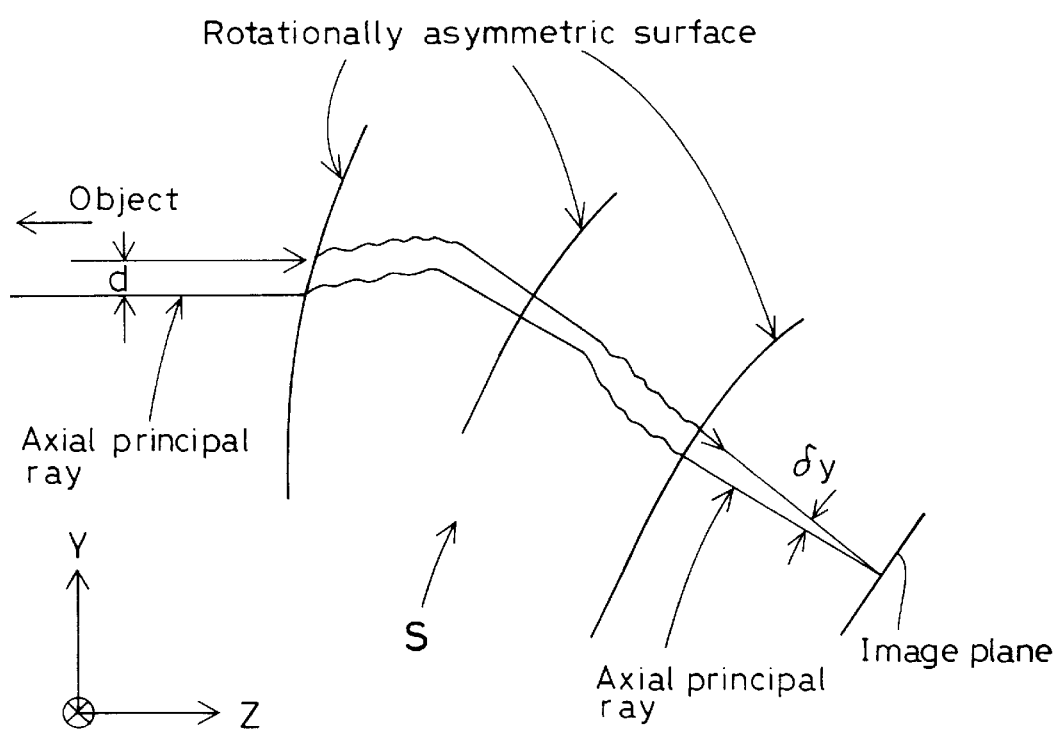
FIG. 15 is a diagram for describing the definition of the power of a decentered optical system and the power of an optical surface.

FIG. 14 is a diagram showing a desirable arrangement for the image-forming optical system according to the present invention when the image-forming optical system is placed in front of an image pickup device, e.g. a CCD, or a filter. In the figure, a decentered prism P is the prism member included in the image-forming optical system according to the present invention. When the image pickup surface C of an image pickup device forms a quadrangle as shown in the figure, it is desirable from the viewpoint of forming a beautiful image to place the decentered prism P so that the plane D of symmetry of a plane-symmetry free-form surface provided in the decentered prism P is parallel to at least one of the sides forming the quadrangular image pickup surface C.

When the image pickup surface C has a shape in which each of the four interior angles is approximately 90 degrees, such as a square or a rectangle, it is desirable that the plane D of symmetry of the plane-symmetry free-form surface should be parallel to two sides of the image pickup surface C that are parallel to each other. It is more desirable that the plane D of symmetry should lie at the middle between two parallel sides and coincide with a position where the image pickup surface C is in a symmetry between the right and left halves or between the upper and lower halves. The described arrangement enables the required assembly accuracy to be readily obtained when the image-forming optical system is incorporated into an apparatus. This is useful for mass-production.

When a plurality or all of the optical surfaces constituting the decentered prism P, i.e. the first surface, the second surface, the third surface, and the fourth surface, are plane-symmetry free-form surfaces, it is desirable from the viewpoint of design and aberration correcting performance to arrange the decentered prism P so that the planes of symmetry of the plurality or all of the optical surfaces are in the same plane D. In addition, it is desirable that the plane D of symmetry and the image pickup surface C should be in the above-described relationship.

As will be clear from the foregoing description, the present invention makes it possible to obtain a high-performance and low-cost image-forming optical system with a minimal number of constituent optical elements. In addition, it is possible to obtain a high-performance image-forming optical system that is made compact and thin by folding an optical path using reflecting surfaces arranged to minimize the number of reflections.

What we claim is:

1. An image-forming optical system having a positive refracting power as a whole for forming an object image, said image-forming optical system comprising:

only one prism member formed from a medium having a refractive index (n) larger than 1 (n>1), said prism member having:

a first surface through which a light beam enters said prism member;

a second surface that reflects the light beam in said prism member;

a third surface that reflects the light beam reflected by said second surface in said prism member; and a fourth surface through which the light beam reflected by said third surface exits from said prism member;

wherein at least one of said second surface and said third surface has a curved surface configuration that gives a power to a light beam, said curved surface configuration having a rotationally asymmetric surface configuration that corrects aberrations due to decentration;

wherein a pupil is provided between said first surface and fourth surface of said prism member.

2. An image-forming optical system according to claim 1, wherein said first surface and said fourth surface substantially face each other across said medium, and said second surface and said third surface substantially face each other across said medium, so that rays entering said prism member through said first surface form a folded optical path toward said third surface through reflection at said second surface, and the rays reflected by said second surface form a folded optical path toward said fourth surface through reflection at said third surface.

3. An image-forming optical system according to claim 1, wherein when a light ray passing through a center of an image plane, which is determined by said image-forming optical system, and also passing through a center of the pupil is defined as an axial principal ray, said second surface has a configuration that reflects rays entering said prism member through said first surface while giving a negative power to the rays in a plane containing the axial principal ray traveling from said first surface to said fourth surface.

4. An image-forming optical system according to any one of claims 1 to 3, wherein when a light ray passing through a center of an image plane, which is determined by said image-forming optical system, and also passing through a center of the pupil is defined as an axial principal ray, said third surface has a configuration that reflects rays reflected in said prism member by said second surface while giving a positive power to the rays.

5. An image-forming optical system according to any one of claims 1 to 3, wherein when a light ray passing through a center of an image plane, which is determined by said image-forming optical system, and also passing through a center of the pupil is defined as an axial principal ray, said prism member is arranged such that the axial principal ray traveling through said medium from said first surface to said fourth surface forms a Z-shaped optical path.

6. An image-forming optical system according to any one of claims 1 to 3, wherein the pupil is placed in an optical path between said first surface and said third surface.

7. An image-forming optical system according to claim 6, wherein said pupil is placed on said second surface.

8. An image-forming optical system according to claim 6, wherein said second surface is smaller than any of said first surface, said third surface and said fourth surface in terms of size of an effective surface area that contributes to transmission or reflection of a light beam.

9. An image-forming optical system according to any one of claims 1 to 3, wherein both the second surface and third surface of said prism member have a rotationally asymmetric surface configuration that gives a power to a light beam and corrects aberrations due to decentration.

10. An image-forming optical system according to claim 9, wherein the rotationally asymmetric surface configuration of at least one of the second surface and third surface of said prism member is a plane-symmetry free-form surface having only one plane of symmetry.

11. An image-forming optical system according to claim 9, wherein the rotationally asymmetric surface configurations of both the second surface and third surface of said prism member are plane-symmetry free-form surfaces each having only one plane of symmetry.

12. An image-forming optical system according to claim 11, wherein the only one plane of symmetry of the plane-symmetry free-form surface that forms said second surface and the only one plane of symmetry of the plane-symmetry free-form surface that forms said third surface are in a same plane.

13. An image-forming optical system according to claim 12, wherein the only one plane of symmetry of the plane-symmetry free-form surface that forms said second surface and the only one plane of symmetry of the plane-symmetry free-form surface that forms said third surface are approximately coincident with a center of said pupil.

14. An image-forming optical system according to claim 8, wherein at least one of the first surface and fourth surface of said prism member has a rotationally asymmetric surface configuration that gives a power to a light beam and corrects aberrations due to decentration.

15. An image-forming optical system according to claim 14, wherein the rotationally asymmetric surface configuration of at least one of the first surface and fourth surface of said prism member is a plane-symmetry free-form surface having only one plane of symmetry.

16. An image-forming optical system according to claim 8, wherein both the first surface and fourth surface of said prism member have a rotationally asymmetric surface configuration that gives a power to a light beam and corrects aberrations due to decentration.

17. An image-forming optical system according to claim 16, wherein the rotationally asymmetric surface configurations of both the first surface and fourth surface of said prism member are plane-symmetry free-form surfaces each having only one plane of symmetry.

18. An image-forming optical system according to any one of claims 1 to 3, wherein a stop is placed on said pupil.

19. An image-forming optical system according to any one of claims 1 to 3, wherein when a decentration direction of said image-forming optical system is a Y-axis direction and a plane parallel to an axial principal ray is a YZ-plane, at least one of the following conditions is satisfied:

$$-2.0 < Pxs2/Px < 0.0 \quad (1)$$

$$-3.0 < Pys2/Py < -0.2 \quad (2)$$

where Pxs2/Px is a value obtained by dividing a power in an X-axis direction of the second surface of said prism member by a power in the X-axis direction of said image-forming optical system, and Pys2/Py is a value obtained by dividing a power in the Y-axis direction of the second surface of said prism member by a power in the Y-axis direction of said image-forming optical system.

20. An image-forming optical system according to any one of claims 1 to 3, wherein when a decentration direction of said image-forming optical system is a Y-axis direction and a plane parallel to an axial principal ray is a YZ-plane, at least one of the following conditions is satisfied:

$$0 < Pxs3/Px < 3.0 \quad (3)$$

$$0 < Pys3/Py < 3.0 \quad (4)$$

where Pxs3/Px is a value obtained by dividing a power in an X-axis direction of the third surface of said prism member by a power in the X-axis direction of said image-forming optical system, and Pys3/Py is a value obtained by dividing a power in the Y-axis direction of the third surface of said prism member by a power in the Y-axis direction of said image-forming optical system.

21. An image-forming optical system according to any one of claims 1 to 3, wherein the following condition is satisfied:

$$10° < S2\theta < 80° \quad (5)$$

where S2θ is an angle of incidence of an axial principal ray on the second surface of said prism member.

22. An image-forming optical system according to any one of claims 1 to 3, wherein the following condition is satisfied:

$$0° < S3\theta < 40° \quad (6)$$

where S3θ is an angle of incidence of an axial principal ray on the third surface of said prism member.

23. A finder optical system comprising:

the image-forming optical system of any one of claims 1 to 3, said image-forming optical system being provided as a finder objective optical system;

an image-inverting optical system for erecting an object image formed by said finder objective optical system; and an ocular optical system.

24. A camera apparatus comprising:

the finder optical system of claim 23; and an objective optical system for photography provided in parallel to said finder optical system.

25. An image pickup optical system comprising:

the image-forming optical system of any one of claims 1 to 3; and an image pickup device placed in an image plane formed by said image-forming optical system.

26. A camera apparatus comprising:

the image-forming optical system of any one of claims 1 to 3, said image-forming optical system being provided as an objective optical system for photography; and a finder optical system placed in one of an optical path separate from an optical path of said objective optical system for photography and an optical path branched from the optical path of said objective optical system for photography.

27. An electronic camera apparatus comprising:

the image-forming optical system of any one of claims 1 to 3;

an image pickup device placed in an image plane formed by said image-forming optical system;

a recording medium for recording image information received by said image pickup device; and an image display device that receives image information from one of said recording medium and said image pickup device to form an image for observation.

28. An endoscope system comprising:

an observation system having the image-forming optical system of any one of claims 1 to 3 and an image transmitting member for transmitting an image formed by said image-forming optical system along a longitudinal axis; and an illumination system having an illuminating light source and an illuminating light transmitting member for transmitting illuminating light from said illuminating light source along said longitudinal axis.

* * * * *